(12) United States Patent
Joshi et al.

(10) Patent No.: US 9,549,182 B2
(45) Date of Patent: Jan. 17, 2017

(54) REPOSITIONING OF PREDICTION RESIDUAL BLOCKS IN VIDEO CODING

(71) Applicant: QUALCOMM Incorporated, San Diego, CA (US)

(72) Inventors: Rajan Laxman Joshi, San Diego, CA (US); Marta Karczewicz, San Diego, CA (US); Joel Sole Rojals, La Jolla, CA (US); Chao Pang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 14/259,046

(22) Filed: Apr. 22, 2014

(65) Prior Publication Data

US 2014/0226721 A1    Aug. 14, 2014

Related U.S. Application Data

(63) Continuation-in-part of application No. 13/939,037, filed on Jul. 10, 2013, now Pat. No. 9,264,713.
(Continued)

(51) Int. Cl.
*H04N 11/02* (2006.01)
*H04N 19/593* (2014.01)
(Continued)

(52) U.S. Cl.
CPC ...... *H04N 19/00763* (2013.01); *H04N 19/129* (2014.11); *H04N 19/14* (2014.11); *H04N 19/159* (2014.11); *H04N 19/176* (2014.11); *H04N 19/593* (2014.11); *H04N 19/88* (2014.11); *H04N 19/46* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 6,674,910 B1 * | 1/2004 | Moon .................. | H04N 19/176 |
| | | | 375/E7.143 |
| 2011/0097003 A1 | 4/2011 | Alshina et al. | |

(Continued)

OTHER PUBLICATIONS

International Search Report and Written Opinion—PCT/US2014/035185—ISA/EPO—Jul. 21, 2014, 14 pp.
(Continued)

*Primary Examiner* — Leron Beck
(74) *Attorney, Agent, or Firm* — Shumaker & Sieffert, P.A.

(57) ABSTRACT

Techniques are described for coding residual data of a prediction residual block in either a lossy or lossless coding mode, in which a transform is skipped or bypassed. The techniques of this disclosure include determining whether to reposition, e.g., rotate or flip, residual data of a residual block prior to coding the residual data of the residual block. For both the lossy and lossless coding modes, a video coding device determines whether to reposition residual data of a residual block based on a prediction mode of the residual block and a size of the residual block. In some examples, the techniques disable repositioning for all residual blocks in the inter-prediction mode and the intra block copying prediction mode, and determine to reposition residual blocks in the intra-prediction mode when the residual blocks have block sizes that are less than or equal to a threshold size.

27 Claims, 12 Drawing Sheets

Related U.S. Application Data

(60) Provisional application No. 61/670,569, filed on Jul. 11, 2012, provisional application No. 61/815,148, filed on Apr. 23, 2013, provisional application No. 61/833,781, filed on Jun. 11, 2013, provisional application No. 61/890,102, filed on Oct. 11, 2013.

(51) Int. Cl.
| | |
|---|---|
| *H04N 19/159* | (2014.01) |
| *H04N 19/176* | (2014.01) |
| *H04N 19/129* | (2014.01) |
| *H04N 19/14* | (2014.01) |
| *H04N 19/88* | (2014.01) |
| *H04N 19/46* | (2014.01) |

(56) References Cited

U.S. PATENT DOCUMENTS

| | | |
|---|---|---|
| 2012/0082391 A1 | 4/2012 | Fernandes |
| 2013/0003856 A1 | 1/2013 | Saxena et al. |
| 2013/0051475 A1 | 2/2013 | Joshi et al. |
| 2013/0058407 A1 | 3/2013 | Sole Rojals et al. |
| 2013/0128966 A1 | 5/2013 | Gao et al. |
| 2014/0016698 A1 | 1/2014 | Joshi et al. |

OTHER PUBLICATIONS

An et al., "Non-CE7: Boundary-Development Transform for Inter-Predicted Residue," Document JCTVC-G281, 7th Meeting: Geneva, CH, Nov. 21-30, 2011, 11 pp.

An et al., "Residue scan for intra transform skip mode," JCT-VC Meeting; MPEG Meeting; Stockholm; (Joint Collaborative Team on Video Cooing of ISO/IEC JTC1/SC29/WG11 AM) ITU-T SG.16); URL: http://wftp3.ittj.int/av-arch/jctvc-site/, Document JCTVC-J0053, Jul. 11-20, 2012, 5 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Flynn et al., "High Efficiency Video Coding (HEVC) Range Extensions Text Specification: Draft 4," Joint Collaborative Team on Video Coding (JCT-VC) of ITU-T SG 16 WP 3 and ISO/IEC JTC 1/SC 29/WG 11, Document JCTVC-N1005_v1, Apr. 18-26, 2013, 332 pp.

He et al., "Rotation of Residual Block for Transform Skipping," JCT-VC Meeting; MPEG Meeting; Stockholm; (Joint Collaborative Team on Video Coding of ISO/IEC JTC1/SC29/WG11 and ITU-T SG.16 ); URL: http://wftp3.itu.int/av-arch/jctvc-site/ Document JCTVC-J0093, Apr. 27-May 7, 2012, 7 pp.

International Preliminary Report on Patentability—PCT/US2013/050099, The International Bureau of WIPO—Geneva, Switzerland, Oct. 6, 2014, 22 pp.

International Search Report and Written Opinion—PCT/US2013/050099—ISA/EPO—Sep. 26, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Kim et al., "A Fast Intra Skip Detection Algorithm for H.264/AVC Video Encoding," ETRI Journal, vol. 28, No. 6, Dec. 2006, 11 pp.

Kim et al., "Coefficient scan for transform skip mode," JCT-VC Meeting; MPEG Meeting; Stockholm; (Joint Collaborative Team on Video Coding of ISO/IEC JTC1/SC29/WG11 and ITU-T SG.16); URL: http://wftp3.itu.int/av-arch/jctvc-site/ No. Document JCTVC-J0202, Jul. 11-20, 2012, 7 pp.

Mrak et al., "Transform skip mode," JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/ No. Document JCTVC-G575, Nov. 21-30, 2011, 13 pp.

Peng et al., "Inter transform skipping," JCT-VC Meeting; MPEG Meeting; Stockholm; (Joint Collaborative Team on Video Coding of ISO/IEC JTC1/SC29/WG11 and ITU-T SG.16); URL: http://wftp3.itu.int/av-arch/jctvc-site/ No. Document JCTVC-J0237, Jul. 11-20, 2012, 4 pp.

Peng et al., "On residual rotation for Inter and Intra BC modes," JCT-VC Meeting; Geneva; (Joint Collaborative Team on Video Coding of ISO/IEC JTC1/SC29/WG11 and ITU-T SG.16 ); URL: http://wftp3.itu.int/av-arch/jctvc-site/,,No. Document JCTVC-00186, Oct. 23-Nov. 1, 2013, 7 pp.

Sole et al., "AhG8: Residue Rotation and Significance Map Context for Screen Content Coding," Joint Collaborative Team on Video Coding (JCT-VC) of ITU-T SG 16 WP 3 and ISO/IEC JTC 1/SC 29/WG 11, 13th Meeting, Document: JCTVC-M0333, Apr. 18-26, 2013, 5 pp.

Tsukuba et al., "Combination of JCTVC-J0069 and JCTVC-J0093," Joint Collaborative Team on Video Coding (JCT-VC) of ITU-T SG 16 WP 3 and ISO/IEC JTC 1/SC 29/WG 11, 10th Meeting: Stockholm, SE, Document JCTVC-J0468r1, Jul. 11-20, 2012, 7 pp.

Weerakkody et al., "Mirroring of Coefficients for Transform Skipping," JCT-VC Meeting; MPEG Meeting; Shanghai; (Joint Collaborative Team on Video Coding of ISO/IEC JTC1/SC29/WG11 and ITU-T SG.16 ); URL: http://wftp3.itu.int/av-arch/jctvc-site/,,No. Document JCTVC-K0294, Oct. 10-19, 2012, 3 pp.

Weerakkody et al., "Mirroring of Coefficients for Transform Skipping," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, Document JCTVC-K0294_r1, 4 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Yin et al., "Fast Mode Decision and Motion Estimation for JVT/H.264," 2003 International Conference on Image Processing, IEEE, vol. 3, Sep. 14-17, 2003, 4 pp.

Second Written Opinion of international application No. PCT/US2013/050099, mailed Jul. 11, 2014, 6 pp.

\* cited by examiner

REPOSITIONING OF PREDICTION RESIDUAL BLOCKS IN VIDEO CODING

This application is a continuation-in-part of U.S. application Ser. No. 13/939,037, filed Jul. 10, 2013, which claims the benefit of U.S. Provisional Application No. 61/670,569, filed Jul. 11, 2012; U.S. Provisional Application No. 61/815,148, filed Apr. 23, 2013; and U.S. Provisional Application No. 61/833,781, filed Jun. 11, 2013, the entire content of each of which is incorporated herein by reference. This application also claims the benefit of U.S. Provisional Application No. 61/890,102, filed Oct. 11, 2013, the entire content of which is incorporated herein by reference.

TECHNICAL FIELD

This disclosure relates to video coding (i.e., video encoding and video decoding), and particularly lossless video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-prediction block is encoded according to a motion vector that points to a block of reference samples forming the predictive block within a previously decoded reference picture, and the residual data indicating the difference between the pixels of the coded block and the predictive block. An intra-coded block is encoded according to an intra-prediction mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding residual data of a prediction residual block in either a lossy coding mode or a lossless coding mode, in which a transform is skipped or bypassed. When a transform is not applied to a residual block, e.g., in a lossless coding mode or a lossy coding mode using a transform skip mode, residual data with higher energy, i.e., larger pixel difference values, than average may not be positioned at a top left corner of the residual block, which is expected for entropy coding. The techniques of this disclosure include determining whether to reposition, e.g., rotate or flip, residual data of a residual block prior to coding the residual data of the residual block.

According to an example video coding standard, such as the Range Extensions of High Efficiency Video Coding (HEVC), in the lossy coding mode, a transform skip mode may be applied to residual blocks of any size, and in the lossless coding mode, transform and quantization procedures are bypassed for all residual blocks. According to the techniques of this disclosure, when a transform is not applied to a residual block in either the lossy coding mode or the lossless coding mode, the repositioning of residual data of the residual block may be restricted to certain prediction modes and certain block sizes. For example, a video encoder or a video decoder may determine whether to reposition the residual data of the residual block based on the prediction mode of the residual block, e.g., the intra-prediction mode, the inter-prediction, or the intra block copying prediction mode, and the size of the residual block. In some examples, the techniques disable repositioning of the residual data for all residual blocks in the inter-prediction mode and the intra block copying prediction mode. In other examples, the techniques determine to reposition residual blocks in the intra-prediction mode when the residual blocks have block sizes that are less than or equal to a threshold size.

In one example, this disclosure is directed to a method of decoding video data, the method comprising decoding a residual block of video data in either a lossy coding mode or a lossless coding mode based on one or more syntax elements indicating that a transform is not applied to the residual video block, and determining, based on a prediction mode of the residual block and a size of the residual block, whether to reposition residual data of the residual block prior to reconstructing a video block from the residual data of the residual block, wherein repositioning the residual data comprises one of rotating or flipping the residual data of the residual block.

In another example, this disclosure is directed to a method of encoding video data, the method comprising encoding a residual block of video data in either a lossy coding mode or a lossless coding mode, wherein a transform is not applied to the residual video block, and determining, based on a prediction mode of the residual block and a size of the residual block, whether to reposition residual data of the residual block prior to encoding the residual data of the residual block, wherein repositioning the residual data comprises one of rotating or flipping the residual data of the residual block.

In a further example, this disclosure is directed to a video coding device for coding video data, the device comprising a memory configured to store video data, and one or more processors configured to code a residual block of video data in either a lossy coding mode or a lossless coding mode, wherein a transform is not applied to the residual video block in the lossless coding mode, and determine, based on a prediction mode of the residual block and a size of the residual block, whether to reposition residual data of the residual block prior to coding the residual data of the residual block, wherein repositioning the residual data comprises one of rotating or flipping the residual data of the residual block.

In an additional example, this disclosure is directed to a computer readable medium comprising instructions for coding video data, the instructions, when executed, cause one or more programmable processors to code a residual block of video data in either a lossy coding mode or a lossless coding mode, wherein a transform is not applied to the residual video block in the lossless coding mode, and determine, based on a prediction mode of the residual block and a size of the residual block, whether to reposition residual data of the residual block prior to coding the residual data of the residual block, wherein repositioning the residual data comprises one of rotating or flipping the residual data of the residual block.

The details of one or more examples are set forth in the accompanying drawings and the description below. Other features, objects, and advantages will be apparent from the description and drawings, and from the claims.

DETAILED DESCRIPTION

Figure 1:
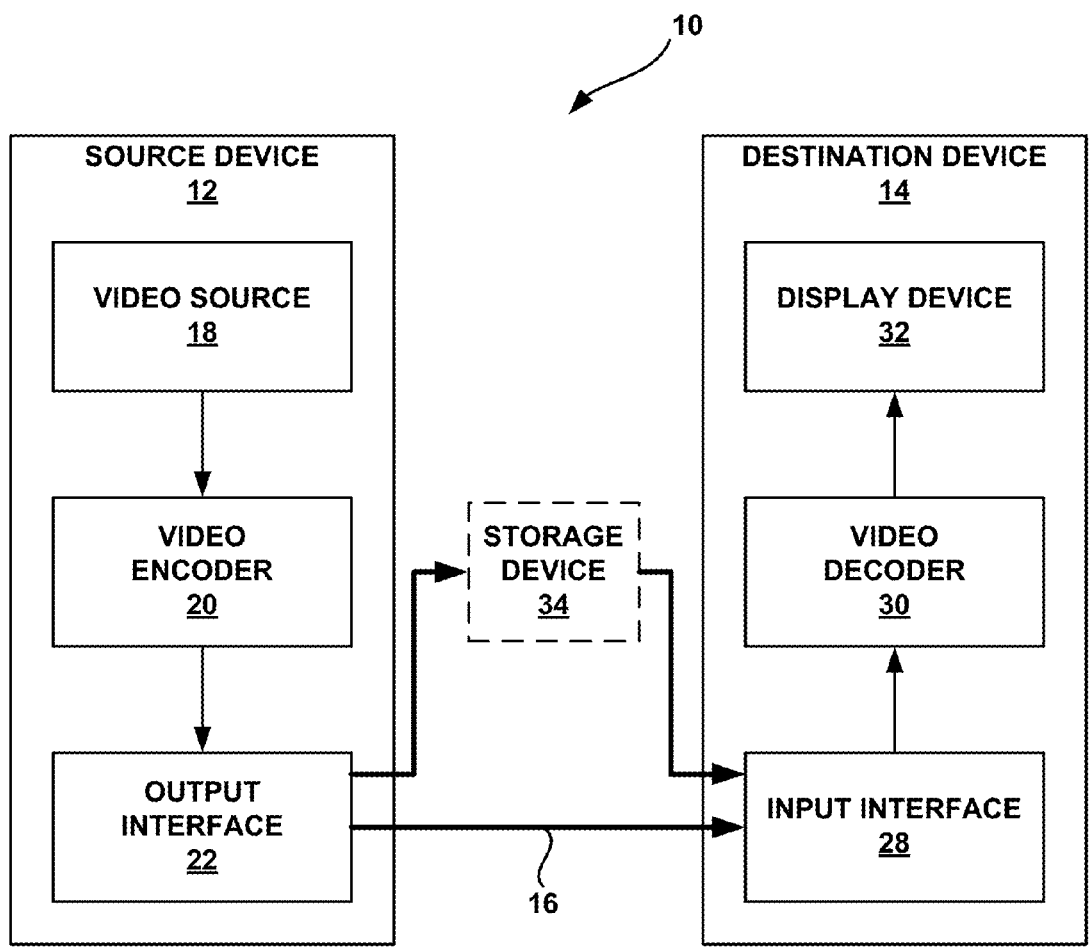
FIG. 1 is a block diagram illustrating an example video encoding and decoding system that may utilize the techniques described in this disclosure to code residual data with transform skipping.

This disclosure describes techniques for coding residual data of a prediction residual block with transform skipping. The residual data of the residual block comprises pixel difference values between pixels of a video block to be coded and corresponding pixels of a prediction block generated for the block to be coded. A transform may be skipped for a residual block when the residual block is coded using either a lossless coding mode or a lossy coding mode in a transform skip mode. When a transform is not applied to a residual block, residual data with higher energy, i.e., larger pixel difference values, than average may not be positioned at a top left corner of the residual block, which is expected for entropy coding.

When the transform is skipped for the residual block, entropy coding efficiency may be improved by rotating the residual block during encoding in order to position the residual data with higher energy than average at the top left corner of the residual block. During decoding, the rotation performed during encoding needs to be reversed in order to reconstruct the original video block from the residual block and a prediction block.

In the intra-prediction mode, when a transform is skipped for a residual block, the residual data with higher energy than average is typically positioned at a bottom right corner of the residual block. In some cases, the intra-prediction residual block may be automatically rotated by 180 degrees prior to coding the residual block in order to position the residual data with higher energy than average at the top left corner of the residual block. In the inter-prediction mode, however, it may not always be desirable to automatically rotate the residual block by 180 degrees.

According to the techniques of this disclosure, based on a transform being skipped for a residual block, a reposition unit included in a video encoder or a video decoder determines whether to rotate the residual block prior to coding residual data of the residual block. In some examples, a rotation value may be explicitly signaled between the video encoder and the video decoder. In other examples, the video encoder and the video decoder may each independently determine whether to rotate the residual block based on a type of boundary at two or more edges of the residual block.

In the inter-prediction mode, residual data at a transform unit (TU) boundary of the residual block, i.e., a boundary between two TUs that belong to the same prediction unit (PU), typically has lower energy than average residual data in the residual block. Further, residual data at a PU boundary of the residual block, i.e., a boundary between two TUs that belong to different PUs, typically has higher energy than average residual data in the residual block. Based on this observation, the techniques of this disclosure including rotating an inter-prediction residual block with transform skipping based on a type of boundary at two or more edges of the residual block. For example, the reposition unit may determine a type of boundary at two or more edges of the residual block, and then determine whether to rotate the residual block based on the type of boundary at the edges in order to reposition the residual data.

In some examples, the reposition unit determines to either rotate the residual block by a predetermined rotation value, e.g., 180 degrees, or not rotate the residual block. In other examples, the reposition unit determines a rotation value by which to rotate the residual block from two or more rotation values, e.g., 0 degrees or no rotation, 180 degrees, 90 degrees or 270 degrees.

On the encoding side, the rotation positions the residual data with higher energy than average at a top left corner of the rotated residual block prior to encoding the residual data of the residual block to improve entropy coding efficiency. On the decoding side, the rotation reverses the rotation performed during encoding and returns the residual data with higher energy than average to its original position in the original residual block in order to reconstruct a video block from the residual block using a predictive block.

This disclosure also describes techniques for coding residual data of a prediction residual block in either a lossy coding mode or a lossless coding mode, in which a transform is skipped or bypassed. The techniques of this disclosure include determining whether to reposition, e.g., rotate or flip, residual data of a residual block prior to coding the residual data of the residual block. In some examples, the residual data of the residual block may be rotated as described above. In other examples, the residual data of the residual block may be flipped along one of a main diagonal or an anti-diagonal of the residual block, which includes swapping residual data on a first side of a diagonal of the residual block with residual data at corresponding mirror image locations on a second side of the diagonal of the residual block to flip the residual data.

According to an example video coding standard, the Range Extensions of High Efficiency Video Coding (HEVC), in the lossy coding mode, a transform skip mode may be applied to residual blocks of any size, and in the lossless coding mode, transform and quantization procedures are bypassed for all residual blocks. In both the lossy coding mode and the lossless coding mode, therefore, the transform may be skipped or bypassed for all block sizes; thus, rotation may be applied to all block sizes in both the intra-prediction mode and the inter-prediction mode. In some examples, in the lossy coding mode, the transform skip mode may be restricted to apply only to residual blocks having sizes up to a maximum block size, e.g., 4×4 or 8×8. The maximum block size for which the transform is permitted to be skipped in the lossy coding mode may be indicated in one of a sequence parameter set (SPS) and a picture parameter set (PPS) associated with the residual block.

According to the techniques of this disclosure, when a transform is not applied to a residual block in either the lossy coding mode or the lossless coding mode, the repositioning of residual data of the residual block may be restricted to certain prediction modes and certain block sizes. For example, a video encoder or a video decoder may determine whether to reposition the residual data of the residual block based on the prediction mode of the residual block, e.g., the intra-prediction mode, the inter-prediction, or the intra block copying prediction mode, and the size of the residual block. In some examples, the techniques disable repositioning of the residual data for all residual blocks in the inter-prediction mode and the intra block copying prediction mode. In other examples, the techniques determine to reposition residual blocks in the intra-prediction mode when the residual blocks have block sizes that are less than or equal to a threshold size. In some cases, the threshold size may be equal to 4×4 or 8×8. In other cases, the threshold size may be less than or equal to a maximum block size for which transform skipping is permitted in the lossy coding mode. In this way, the block sizes for which rotation may be applied to intra-prediction mode residual blocks are the same in both the lossless coding mode and the lossy coding mode using the transform skip mode.

FIG. 1 is a block diagram illustrating an example video encoding and decoding system 10 that may utilize the techniques described in this disclosure to code residual data with transform skipping. As shown in FIG. 1, system 10 includes a source device 12 that generates encoded video data to be decoded, e.g., at a later time, by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences. Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry video coding standards. The techniques of this disclosure, however, are not limited to any particular coding standard.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is the new video coding standard, namely HEVC, being developed by the Joint Collaboration Team on Video Coding (JCT-VC) of ITU-T Video Coding Experts Group (VCEG) and ISO/IEC Motion Picture Experts Group (MPEG).

"Working draft 7," or "WD7," of the upcoming HEVC standard is described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, is downloadable from http://phenix.it-sudparis.eu/jct/doc_end_user/documents/9_Geneva/wg11/JCTVC-I1003-v6.zip. In addition, "working draft 8" or "WD8" of the HEVC standard is described in document JCTVC-J1003_d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, $10^{th}$ Meeting: Stockholm, Sweden, 11-20 Jul. 2012, which is available from http://phenix.int-evey.fr/jct/doc_end_user/documents/10_Stockholm/wg11/JCTVC-J1003-v8.zip.

A draft of the HEVC standard in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, is available from http://phenix.int-evey.fr/jct/doc_end_user/documents/12_Geneva/wg11/JCTVC-L1003-v34.zip. Range Extensions of the HEVC standard are described in document JCTVC-N1005, Flynn, et al., "High Efficiency Video Coding (HEVC) Range Extensions text specification: Draft 4," Joint Collaborative Team on Video Coding (JCT-VC) of ITU-T SG16 WP3 and ISO/IEC JTC1/SC29/WG11, $14^{th}$ Meeting: Vienna, Austria, 25 Jul.-2 Aug. 2013, which is available from http://phenix.int-evey.fr/jct/doc_end_user/documents/14_Vienna/wg11/JCTVC-N1005-v3.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-four intra-prediction encoding modes.

In general, the working model of the HM describes that a video frame or picture may be partitioned into one or more slices, which may be further partitioned into a sequence of treeblocks or largest coding units (LCU), which may be further partitioned into coding units (CUs). A CU generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU includes a coding node and one or more prediction units (PUs) and/or one or more transform units (TUs) associated with the coding node. Syntax data within a bitstream may define a treeblock or LCU, which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf or child nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it may be referred to as a leaf-CU.

Moreover, TUs of leaf-CUs may also be associated with respective quadtree data structures, such as a residual quadtree (RQT). That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs. A TU may be square or non-square in shape.

A leaf-CU may include one or more PUs. In general, a PU represents all or a portion of the corresponding CU, and may include data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PUs may also describe, for example, partitioning of the CU into one or more PUs. Partitioning modes may differ depending on whether the CU is uncoded, intra-prediction mode coded, or inter-prediction mode coded. For intra coding, a PU may be treated the same as a leaf-TU. PUs may be partitioned to be square or non-square in shape.

In general, a TU is used for the transform and quantization processes. Following prediction, residual data values are calculated for the video block identified by the coding node using a predictive block. The coding node is then updated to reference the residual values rather than the original video block. The residual values comprise pixel difference values that may be transformed into transform coefficients, quantized, and scanned to produce serialized transform coefficients for entropy coding. The coding node may once again be updated to refer to these serialized transform coefficients.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Each slice is further partitioned into video blocks that are used encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To code a block (e.g., a PU of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the original video data block and its predictive block is determined. This difference may be referred to as the prediction residual data, and indicates the pixel differences between the pixel values in the block to the coded and the pixel sample values in the predictive block selected to represent the coded block. To achieve better compression, the prediction residual data may be transformed, e.g., using a discrete cosine transform (DCT), an integer transform, a Karhunen-Loeve (K-L) transform, or another transform.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. In some examples, a pre-defined scan order is used to scan the quantized transform coefficients to produce a serialized vector that can be entropy encoded. In other examples, an adaptive scan can be performed.

Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients. An entropy coder applies entropy coding, such as Context Adaptive Variable Length Coding (CAVLC), Context Adaptive Binary Arithmetic Coding (CABAC), Probability Interval Partitioning Entropy Coding (PIPE), or the like, to the one-dimensional vector of scanned quantized transform coefficients.

To perform CABAC, a context within a context model is assigned to a symbol to be transmitted. The context may relate to, for example, whether neighboring values of the symbol are non-zero or not. To perform CAVLC, a variable length code is selected for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In some cases, a transform may be skipped prior to coding residual data of a prediction residual block. In one example, the residual block may be coded using the lossy coding mode in a transform skip mode in which the transform is not applied to the residual block prior to coding the residual data of the residual block. In this case, quantization may still be performed on the residual data of the residual block. For example, HEVC uses a syntax element to indicate the transform skip mode for a TU, i.e., the transform_skip_flag syntax element. In another example, the residual block may be coded using the lossless coding mode in which both the transform and quantization are skipped to achieve lossless coding of the residual data in the residual block. For example, HEVC uses a syntax element to indicate the lossless coding mode for a CU, i.e., the cu_transquant_bypass_flag syntax element.

In JCTVC-J0093 (He, D. et al., "Rotation of Residual Block for Transform Skipping," Joint Collaborative Team on Video Coding (JCT-VC) of ITU-T SG16 WP3 and ISO/IEC JTC1/SC29/WG11, 10th Meeting: Stockholm, Sweden, Jul. 11-20, 2012), it is proposed that when a transform is skipped for a residual block in the intra-prediction mode, the residual block is automatically rotated by 180 degrees before applying entropy coding of the residual data. A similar idea is proposed in JCTVC-J0053 (An, J. et al., "Residue Scan for Intra Transform Skip Mode," Joint Collaborative Team on Video Coding (JCT-VC) of ITU-T SG16 WP3 and ISO/IEC JTC1/SC29/WG11, 10th Meeting: Stockholm, Sweden, Jul. 11-20, 2012) where the direction of scanning the residual data in the intra-prediction residual block (i.e., the pixel difference values) for entropy coding is automatically changed to achieve the same purpose. Similarly, in JCTVC-K0294 (Weerakkody, R. et al., "Mirroring of Coefficients for Transform Skipping," Joint Collaborative Team on Video Coding (JCT-VC) of ITU-T SG16 WP3 and ISO/IEC JTC1/SC29/WG11, 11$^{th}$ Meeting: Shanghai, China, Oct. 10-19, 2012), it is proposed that, depending on the scan being used, residual data of the intra-prediction residual block is automatically flipped along the main diagonal or the anti-diagonal of the residual block.

Furthermore, in the lossless coding mode, a transform is always skipped for a residual block. JCTVC-J0093 proposes to extend the automatic rotation of the prediction residual block by 180 degrees to the lossless coding mode for both the intra-prediction and inter-prediction modes. Some of these ideas are also discussed in JCTVC-J0468 (Tsukuba et al., "Combination of JCTVC-J0069 and JCTVC-J0093," Joint Collaborative Team on Video Coding (JCT-VC) of ITU-T SG 16 WP 3 and ISO/IEC JTC 1/SC 29/WG 11, 10$^{th}$ Meeting, Stockholm, Sweden, July 2012), and JCTVC-M0333 (Sole et al., "AhG8: Residual rotation and significance map context for screen content coding," Joint Collaborative Team on Video Coding (JCT-VC) of ITU-T SG 16 WP 3 and ISO/IEC JTC 1/SC 29/WG 11, 13$^{th}$ Meeting, Incheon, KR, April 2013). The methods proposed in JCTVC-J0053 and JCTVC-K0294 can also be extended to the lossless coding mode for both the intra-prediction and inter-prediction modes.

In intra-coding, the samples from which prediction is performed are positioned on the left side or the top side of a video block. As the distance of the predicted samples from the top side and the left side increases, the prediction error tends to increase. For this reason, the residual data sample values at the bottom right corner of the residual block typically have higher absolute magnitudes compared to those at the top left corner. Transform coefficient coding, i.e., entropy coding, is designed assuming that higher energy residual data is concentrated in the top left corner. For intra-prediction residual blocks, therefore, the automatic rotation of the residual video block by 180 degrees is effective to improve entropy coding efficiency when the lossy coding mode in the transform skip mode is used.

Residual blocks coded in the lossless mode, however, may use intra-prediction residual blocks or inter-prediction residual blocks. For inter-prediction residual blocks, the residual data does not possess the property described above for intra-prediction residual blocks. It may not always be desirable to perform the automatic rotation by 180 degrees for inter-prediction residual blocks.

The techniques of this disclosure include, based on a transform being skipped for a residual block, determining whether or not to rotate the residual block prior to coding residual data of the residual block. In some examples, a rotation value for the residual block may be explicitly signaled in a bitstream between video encoder 20 and video decoder 30. In other examples, video encoder 20 and the video decoder 30 may each independently determine whether to rotate the residual block based on a type of boundary at two or more edges of the residual block.

In JCTVC-G281 (An, J. et al., "Non-CE7: Boundary-Dependent Transform for Inter-Predicted Residue," Joint Collaborative Team on Video Coding (JCT-VC) of ITU-T SG16 WP3 and ISO/IEC JTC1/SC29/WG11, 7th Meeting: Geneva, Switzerland, Nov. 21-30, 2011), the following observation was made regarding the energy of inter-predicted residual data. For a residual block that comprises a TU, if a neighboring block at a particular edge (top, bottom, left or right) of the residual block belongs to the same PU as the residual block, i.e., the neighboring block is a TU belonging to the same PU, the particular edge is a TU boundary and the residual data at the TU boundary typically has lower energy than average residual data of the residual block. On the other hand, if a neighboring block at a particular edge of the residual video block belongs to a different PU than the residual block, i.e., the neighboring block is a TU belonging to a different PU, the particular edge is a PU boundary and the residual data at the TU boundary typically has higher energy than average residual data of the residual block. In this disclosure, a level of energy of residual data at an edge of the residual block is proportional to the size of the residual data, i.e., the absolute magnitude of pixel differences for the residual data sample values at the edge of the residual video block.

Based on the above observation, the techniques of this disclosure include rotating an inter-prediction residual block with transform skipping based on a type of boundary at two or more edges of the residual block. According to the techniques, a reposition unit included in a video encoder or a video decoder determines a type of boundary at two or more edges of the residual block, and then determines, based on the type of boundary at the edges, whether to rotate the residual block in order to position the residual data at the PU boundaries of the original residual block at a top left corner of the rotated residual block. The techniques may be performed by a video coder, such as video encoder 20 or video decoder 30.

In some examples, the reposition unit determines to either rotate the residual block by a predetermined rotation value, e.g., 180 degrees, or not rotate the residual block. In other examples, the reposition unit determines a rotation value by which to rotate the residual block from two or more rotation values, e.g., 0 degrees or no rotation, 180 degrees, 90 degrees or 270 degrees. On the encoding side, the rotation is selected to position the residual data with higher energy than average at a top left corner of the rotated residual block prior to encoding the residual data of the residual block to improve entropy coding efficiency. On the decoding side, the rotation reverses the rotation performed during encoding and returns the residual data with higher energy than average to its original position in the original residual block in order to reconstruct a video block from the residual block using a predictive block.

Figure 2:
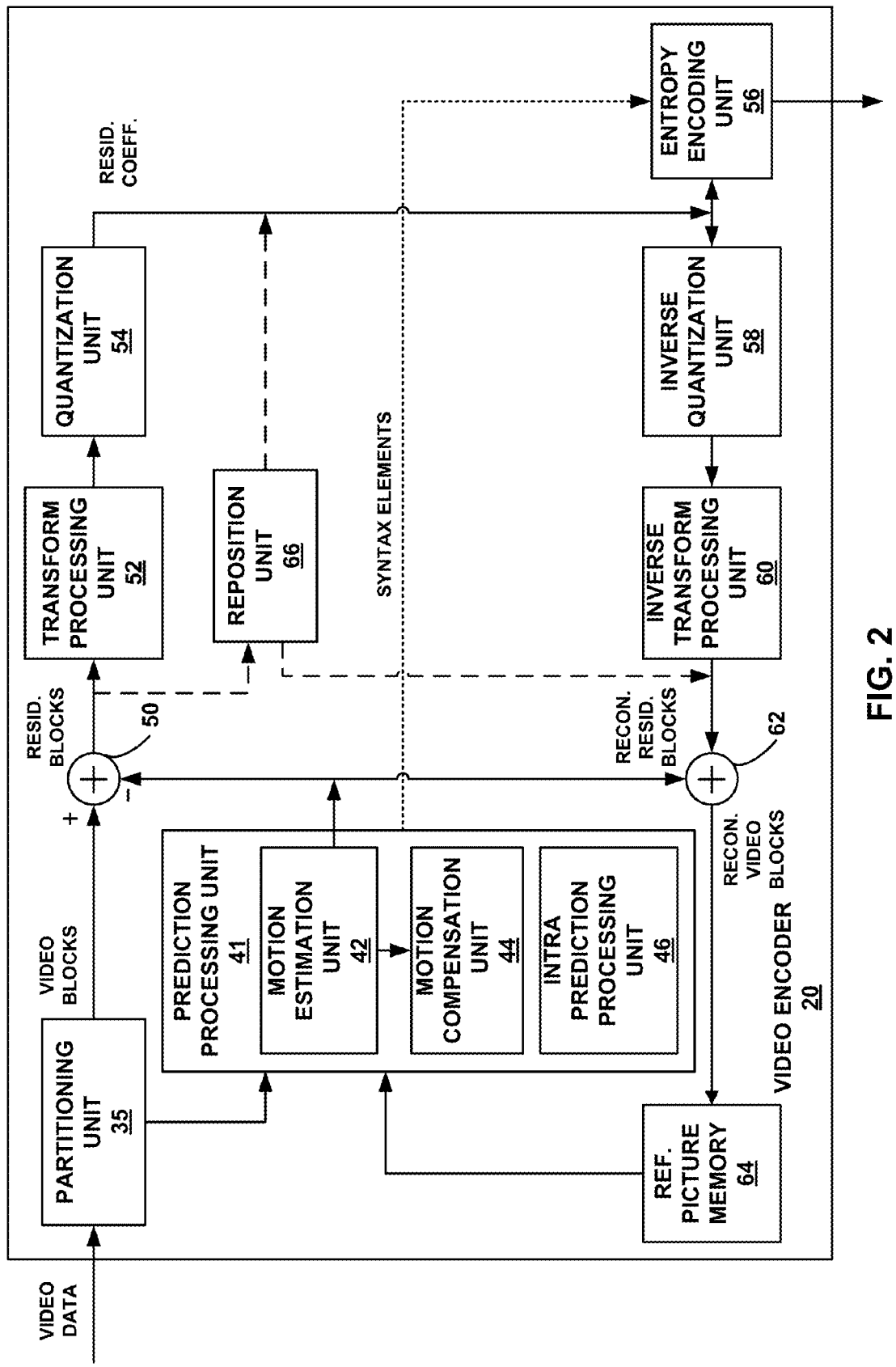
FIG. 2 is a block diagram illustrating an example video encoder that may implement the techniques described in this disclosure to determine whether to rotate a residual block prior to encoding residual data of the residual block.

FIG. 2 is a block diagram illustrating an example video encoder 20 that may implement the techniques described in this disclosure to determine whether to rotate a residual block prior to encoding residual data of the residual block. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, reposition unit 66 and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms residual video blocks by subtracting the predictive block from the current video block. Residual data in the residual video blocks comprise pixel difference values between the current video block to be coded and the predictive block. The residual video blocks may comprise one or more TUs that include at least a portion of the residual data for the video block. When the video block is coded using the lossy coding mode, each of the residual blocks are applied to transform processing unit 52. Transform processing unit 52 transforms the residual data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

When the video block is coded using the lossy coding mode in a transform skip mode, a transform is not applied to the residual blocks. Moreover, when the video block is coded using the lossless coding mode, neither a transform nor quantization is applied to the residual blocks. According to the techniques of this disclosure, when the transform is skipped for a residual block, the residual block is applied to reposition unit 66. In this case, the residual data remains in the pixel domain and comprises pixel difference values at spatial pixel positions. This is opposed to converting the residual data to the transform domain as transform coefficients at positions corresponding to frequency components using transform processing unit 52.

Reposition unit 66 determines whether or not to rotate the residual block to position residual data with higher energy, i.e., larger pixel difference values, than average in a top left corner of the residual block. The shifting of high energy residual data typically occurs as a result of the transform process performed by transform processing unit 52. When the transform is skipped, however, it may be desirable to rotate the residual block because entropy encoding unit 56 was designed based on the assumption that high energy residual data would be concentrated at a top left corner of a transformed residual block.

In the case of intra-prediction residual blocks, reposition unit 66 may automatically rotate the residual blocks by 180 degrees to position the residual data with higher energy than average at the top left corner of the residual block. When a transform is skipped for intra-prediction residual blocks, the high energy residual data typically concentrates at the bottom right corner such that the 180 degree rotation will improve entropy coding efficiency. In the case of inter-prediction residual blocks, the high energy residual data may be concentrated at any position within the residual blocks. In that case, reposition unit 66 may first determine whether to rotate the residual block and then, based on the determination, either rotate the residual block by a determined rotation value or not rotate the residual block. In some examples, reposition unit 66 may apply the determined rotation value to the residual block in a counterclockwise direction. Example operations for determining whether to rotate an inter-prediction residual block are described in more detail below with respect to FIGS. 5-8.

For the lossy coding mode in the transform skip mode, reposition unit 66 sends the rotated residual block to quantization unit 54 for further compression prior to entropy encoding by entropy encoding unit 56. In some cases, the residual block may be sent to quantization unit 54 before determining whether to rotate the residual block with reposition unit 66. For the lossless coding mode, reposition unit 66 sends the rotated residual block directly to entropy encoding unit 56 for entropy encoding without any further compression.

Entropy encoding unit 56 entropy encodes residual coefficients, e.g., quantized transform coefficients, quantized residual coefficients or uncompressed residual coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to a video decoder, e.g., video decoder 30, or archived for later transmission or retrieval by a video decoder. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to the quantized transform coefficients in order to reconstruct the residual block in the pixel domain for later use as a reference block of a reference picture. For the lossy coding mode in the transform skip mode, inverse quantization unit 58 applies inverse quantization to the quantized residual coefficients and reposition unit 66 performs a reverse rotation to return the high energy residual data back to its original position in order to reconstruct the residual block. In some cases, the quantized residual coefficients may be sent to reposition unit 66 to perform the reverse rotation before performing inverse quantization with inverse quantization unit 58. For the lossless coding mode, reposition unit 66 performs a reverse rotation of the residual coefficients to return the high energy residual data back to its original position in order to reconstruct the residual block.

Motion compensation unit 44 may then calculate a reference block by adding the reconstructed residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 may be configured to perform the techniques of this disclosure, including skipping a transform for a residual block, and determining whether to rotate the residual block. Reposition unit 66 of video encoder 20 may determine whether or not to rotate the residual block. In some examples, reposition unit 66 determines whether to rotate the residual block based on the number of bits needed to entropy encode the residual block. For example, reposition unit 66 may determine whether to rotate the residual block based on the rotation value that results in the lowest number of bits for entropy encoding. In other examples, reposition unit 66 may determine whether to rotate the residual block based on a type of boundary at two or more edges of the residual block.

When the residual block is rotated, reposition unit 66 of video encoder 20 may determine to rotate the residual block by a predetermined rotation value, or may determine a rotation value by which to rotate the residual block. In either case, video encoder 20 then rotates the residual block by the determined rotation value prior to encoding the residual data of the residual block with entropy encoding unit 56. Example operations for determining whether to rotate an inter-prediction residual block based on the type of boundary at the edges of the residual block are described in more detail below with respect to FIGS. 5-8.

In some examples, video encoder 20 may only signal whether transform skipping is used for the residual block, i.e., whether the residual block is encoded using the lossless coding mode or using the lossy coding mode in the transform skip mode. In this case, a video decoder may use the same operation of determining the type of boundary at the edges of the residual block to determine whether to rotate the residual block to reverse the rotation performed during encoding in order to reconstruct the video block from the residual block. In other examples, video encoder 20 may signal a rotation value of the rotation applied to the residual block during encoding to a video decoder. In this case, the video decoder may rotate the residual block based on the signaled rotation value to reverse the rotation performed during encoding in order to reconstruct the video block from the residual block.

In some additional examples, video encoder 20 is configured to perform the techniques of this disclosure, including skipping a transform for a residual block and rotating the residual block when a size of the residual block is less than or equal to a threshold block size. The threshold block size may be equal to a block size for which transform skipping and rotation is allowed in the lossy coding mode. In this way, the block sizes for which rotation may be performed are aligned, i.e., the same, for residual blocks coded using either the lossless coding mode or the lossy coding mode in the transform skip mode. This technique may be applicable to both inter-prediction residual blocks and intra-prediction residual block.

Furthermore, video encoder 20 may be configured to perform the techniques of this disclosure, including skipping a transform for a residual block, and flipping residual data sample values along a diagonal of the residual block when a size of the residual block is less than or equal to the threshold block size. Flipping the residual data sample values of the residual block includes swapping residual data sample values on one side of a diagonal with residual data sample values at corresponding mirror image locations on the other side of the diagonal of the residual block. This technique may also be applicable to both inter-prediction residual blocks and intra-prediction residual block.

In some examples, in the case of the lossless coding mode, the rotation or flipping may be applied only to intra-prediction residual blocks with sizes less than or equal to the threshold block size. In other examples, the rotation or flipping may be applied to all residual blocks, i.e., intra-prediction and inter-prediction residual blocks, with sizes less than or equal to the threshold block size. In addition examples, in the case of the lossy coding mode in the transform skip mode, the rotation or flipping may be applied only to intra-prediction residual blocks, or may be applied to both intra-prediction and inter-prediction residual blocks.

Figure 3:
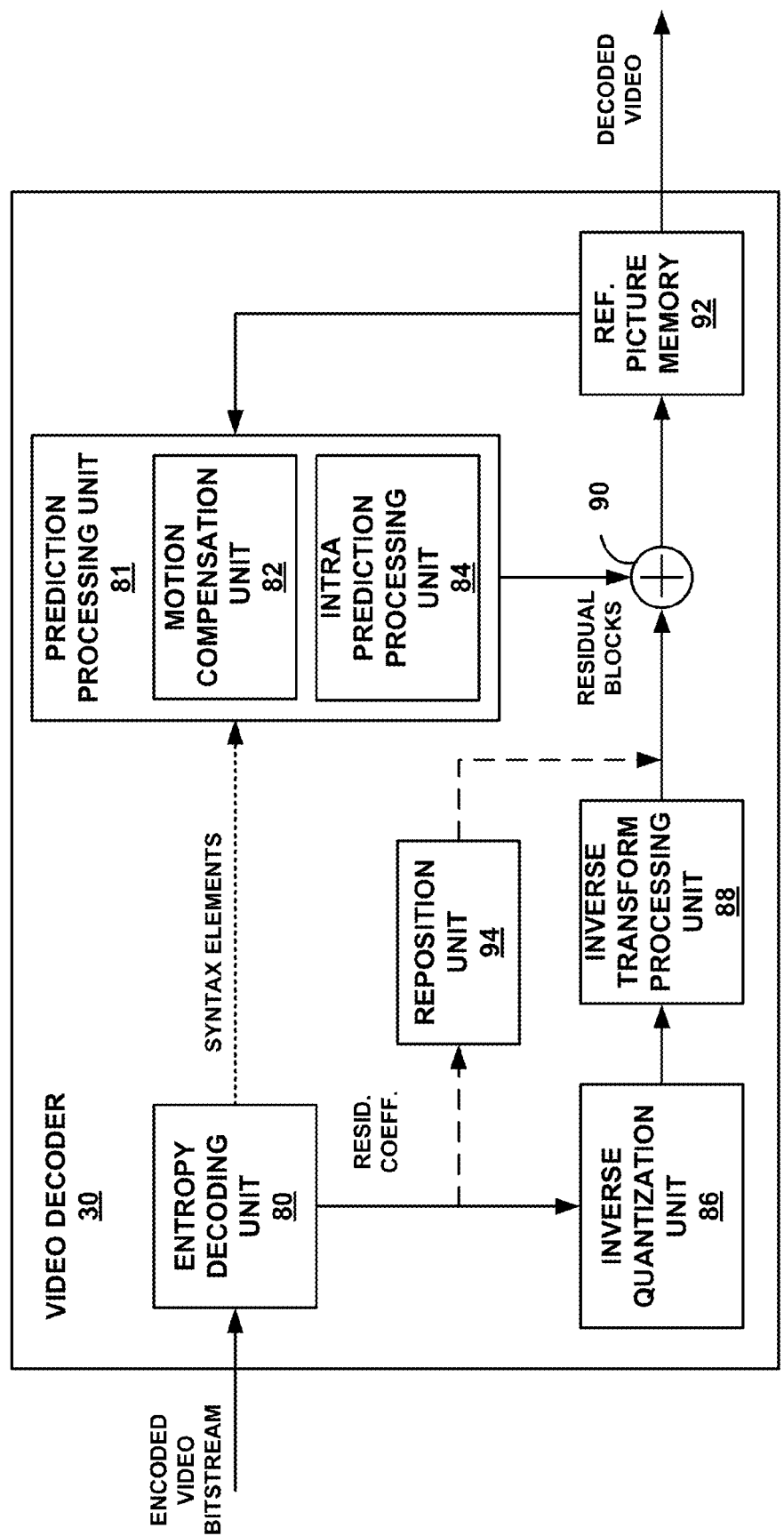
FIG. 3 is a block diagram illustrating an example video decoder that may implement the techniques described in this disclosure to determine whether to rotate a residual block prior to reconstructing a video block from residual data of the residual block.

FIG. 3 is a block diagram illustrating an example video decoder 30 that may implement the techniques described in this disclosure to determine whether to rotate a residual block prior to reconstructing a video block from residual data of the residual block. In the example of FIG. 3, video decoder 30 includes an entropy decoding unit 80, prediction processing unit 81, inverse quantization unit 86, inverse transformation unit 88, reposition unit 94, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from a video encoder, such as video encoder 20. Entropy decoding unit 80 of video decoder 30 entropy decodes the bitstream to generate residual coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

As described above, entropy decoding unit 80 entropy decodes the bitstream to generate residual coefficients, e.g., quantized transform coefficients, quantized residual coefficients or uncompressed residual coefficients, of a video block. When the video block is coded using the lossy coding mode, inverse quantization unit 86 inverse quantizes, i.e., de-quantizes, the quantized transform coefficients of the residual block provided in the bitstream. The inverse quantization process may include use of a quantization parameter calculated for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

When the video block is coded using the lossy coding mode in a transform skip mode, an inverse transform is not applied to the residual blocks. Moreover, when the video block is coded using the lossless coding mode, neither an inverse transform nor inverse quantization is applied to the residual blocks. According to the techniques of this disclosure, when the inverse transform is skipped for residual coefficients of a residual block, the residual block is applied to reposition unit 94. In this case, the residual data remains in the pixel domain and comprises pixel difference values at spatial pixel positions. This is opposed to converting the residual data from the transform domain as transform coefficients at positions corresponding to frequency components using inverse transform processing unit 88.

Reposition unit 94 may rotate the residual block in order to reverse rotation performed during encoding that positioned residual data with higher energy, i.e., larger pixel difference values, than average in a top left corner of the residual block. The shifting of high energy residual data back to its original position typically occurs as a result of the inverse transform process performed by inverse transform processing unit 88. When the inverse transform is skipped, however, it may be necessary to rotate the residual block to properly reconstruct the video block using a predictive block.

For the lossy coding mode in the transform skip mode, inverse quantization unit 86 applies inverse quantization to the quantized residual coefficients of the residual block provided in the bitstream for decompression. Reposition unit 94 then performs a rotation to reverse the rotation performed during encoding and return the high energy residual data back to its original position in order to reconstruct the residual block. In some cases, the quantized residual coefficients may be sent to reposition unit 94 to perform the reverse rotation before performing inverse quantization with inverse quantization unit 86. For the lossless coding mode, reposition unit 94 directly receives the residual coefficients of the residual block provided in the bitstream without any decompression. Reposition unit 94 then performs a rotation to reverse the rotation performed during encoding and return the high energy residual data back to its original position in order to reconstruct the residual block. In this manner, the pixel difference values are rotated back to the original spatial positions of the corresponding pixels.

In the case of intra-prediction residual blocks with transform skipping, the high energy residual data typically concentrates at the bottom right corner such that a 180-degree rotation during encoding will improve entropy coding efficiency. In this case, reposition unit 94 may automatically rotate the intra-prediction residual blocks by 180 degrees to return the residual data with higher energy than average back to its position at the bottom right corner of the original residual block.

In the case of inter-prediction residual blocks, the high energy residual data may be concentrated at any position within the residual blocks. In this case, reposition unit 94 first determines whether to rotate the residual block and then, based on the determination, either rotates the residual block by a determined rotation value or does not rotate the residual block. In order to reverse rotation performed on the residual block during encoding, reposition unit 94 determines whether to rotate the residual block, but applies the determined rotation value in an opposite direction than reposition unit 66 of video encoder 20 from FIG. 2, e.g., in the clockwise direction as opposed to the counterclockwise direction.

After motion compensation unit 82 generates the predictive block for the current video block based on the motion vectors and other syntax elements, video decoder 30 forms a decoded video block by summing the reconstructed residual blocks with the corresponding predictive blocks generated by motion compensation unit 82. More specifically, the pixel difference values of the residual block are summed with corresponding predictive pixel values of the corresponding predictive blocks. This summation process is performed for both luma and chroma blocks in order to reconstruct the entire video block. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video decoder 30 may be configured to perform the techniques of this disclosure, including skipping an inverse transform for a residual block, and determining whether to rotate the residual block. Reposition unit 94 of video decoder 30 may determine whether or not to rotate the residual block. In some examples, reposition unit 94 determines whether to rotate the residual block based on syntax elements in the bitstream that indicate a rotation value for the residual block used at video encoder 20. In other examples, reposition unit 94 may determine whether to rotate the residual block based on a type of boundary at two or more edges of the residual block.

When the residual block is rotated, reposition unit 94 of video decoder 30 may determine to rotate the residual block by a predetermined rotation value, or may determine a rotation value by which to rotate the residual block. In either case, video decoder 30 then rotates the residual block by the determined rotation value prior to reconstructing a video block from the residual block using a predictive block. Example operations for determining whether to rotate an inter-prediction residual block based on the type of boundary at the edges of the residual block are described in more detail below with respect to FIGS. 5-8.

In some examples, video decoder 30 may receive syntax elements that only indicate whether transform skipping is used for the residual block, i.e., whether the residual block is encoded using the lossless coding mode or using the lossy coding mode in the transform skip mode. In this case, reposition unit 94 uses the same operation as video encoder 20 to determine a type of boundary at the edges of the residual block to determine whether to rotate the residual block to reverse the rotation performed during encoding in order to reconstruct the video block from the residual block. In other examples, video decoder 30 may receive syntax elements that indicate a rotation value of the rotation, e.g., 0, 90, 180 or 270 degrees, applied to the residual block during encoding. In this case, reposition unit 94 may rotate the residual block based on the signaled rotation value to reverse the rotation performed during encoding, e.g., by rotating 0, 90, 180 or 270 degrees in an opposite direction, in order to reconstruct the video block from the residual block. Example operations for determining whether to rotate an inter-prediction residual block are described in more detail below with respect to FIGS. 5-8.

In some additional examples, video decoder 30 is configured to perform the techniques of this disclosure, including skipping a transform for a residual block and rotating the residual block when a size of the residual block is less than or equal to a threshold block size. The threshold block size may be equal to a block size for which transform skipping and rotation is allowed in the lossy coding mode. In this way, the block sizes for which rotation may be performed are aligned, i.e., the same, for residual blocks coded using either the lossless coding mode or the lossy coding mode in the transform skip mode. This technique may be applicable to both inter-prediction residual blocks and intra-prediction residual block.

Furthermore, video decoder 30 may be configured to perform the techniques of this disclosure, including skipping a transform for a residual block, and flipping residual data sample values along a diagonal of the residual block when a size of the residual block is less than or equal to a threshold block size. Flipping the residual data sample values of the residual block includes swapping residual data sample values on one side of a diagonal with residual data sample values at corresponding mirror image locations on the other side of the diagonal of the residual block. This technique may be applicable to both inter-prediction residual blocks and intra-prediction residual block.

In some examples, in the case of the lossless coding mode, the rotation or flipping may be applied only to intra-prediction residual blocks with sizes less than or equal to the threshold block size. In other examples, the rotation or flipping may be applied to all residual blocks, i.e., intra-prediction and inter-prediction residual blocks, with sizes less than or equal to the threshold block size. In addition examples, in the case of the lossy coding mode in the transform skip mode, the rotation or flipping may be applied only to intra-prediction residual blocks, or may be applied to both intra-prediction and inter-prediction residual blocks.

Figure 4:
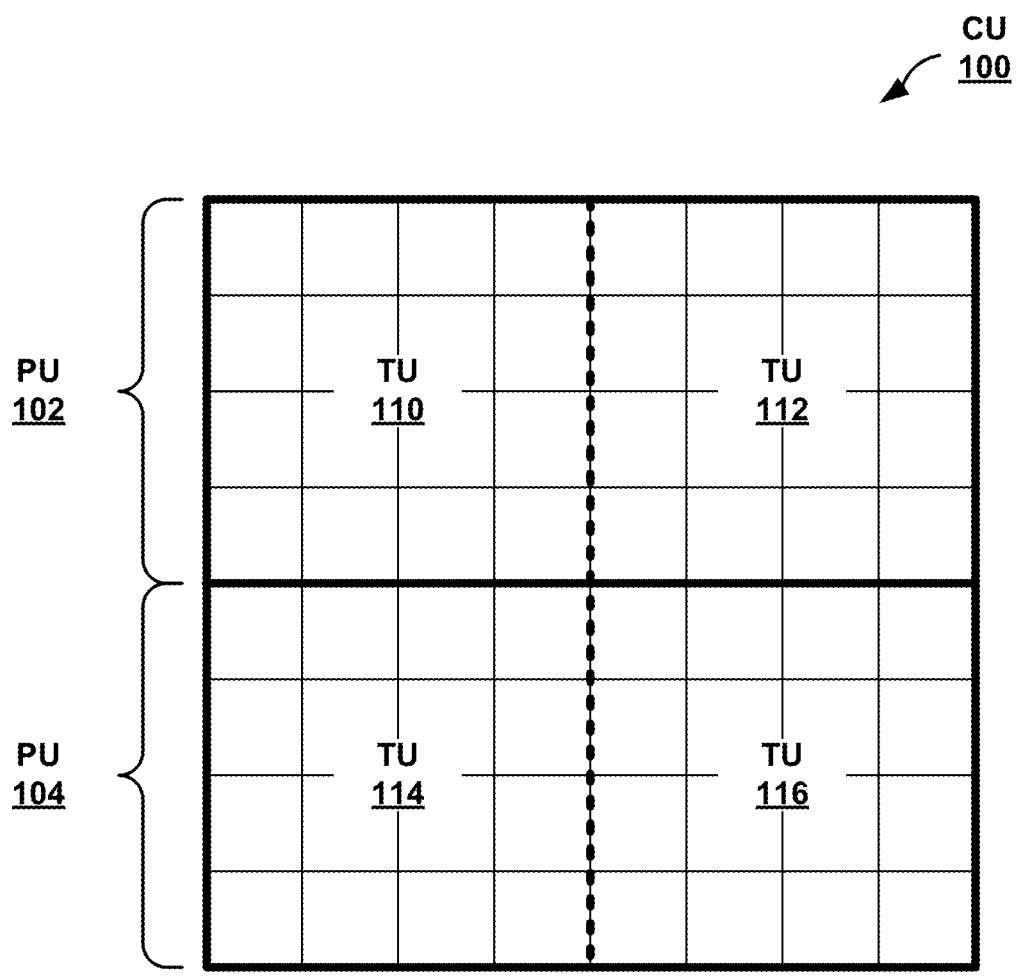
FIG. 4 is a block diagram illustrating a coding unit (CU) of a residual block partitioned into one or more prediction units (PUs) according to a motion prediction mode and multiple transform units (TUs) according to a quad-tree data structure.

FIG. 4 is a block diagram illustrating a CU 100 of a residual block partitioned into one or more PUs 102, 104 according to a motion prediction mode and multiple TUs 110, 112, 114, 116 according to a quad-tree data structure. In FIG. 4, PU boundaries are illustrated as bold, solid lines around the edge of PUs 102 and 104. A PU boundary comprises a boundary between two TUs that belong to different PUs, e.g., the boundary between TU 110 within PU 102 and TU 114 within PU 104. In FIG. 4, TU boundaries are illustrates as bold, dashed lines between TU 110 and TU 112 within PU 102, and between TU 114 and TU 116 within PU 104. A TU boundary comprises a boundary between two TUs that belong to the same PU, e.g., the boundary between TU 110 and TU 112 within PU 102

In general, this disclosure describes techniques for coding residual data of a prediction residual block, e.g., TU 112, with transform skipping. The residual data of TU 112 comprises pixel difference values between a portion of a video block and an associated prediction block. A transform may be skipped for TU 112 when TU 112 is coded using either a lossless coding mode or a lossy coding mode in a transform skip mode. Without applying a transform to TU 112, the residual data with higher energy, i.e., larger pixel difference values, than average may not be positioned at a top left corner of TU 112, which is expected for entropy coding.

In the intra-prediction mode, when a transform is skipped for a residual block, the residual data with higher energy than average is typically positioned at a bottom right corner of the intra-prediction residual block. In some cases, the intra-prediction residual block may be automatically rotated by 180 degrees prior to coding the residual block in order to position the residual data with higher energy than average at the top left corner of the residual block. In the inter-prediction mode, however, it may not always be desirable to automatically rotate the residual block by 180 degrees.

The following observation has been made regarding the energy of residual data of an inter-prediction residual block. Residual data at a TU boundary of the inter-prediction residual block typically has lower energy than average residual data in the residual block. Further, residual data at a PU boundary of the inter-prediction residual block typically has higher energy than average residual data in the residual block. Based on this observation, the techniques of this disclosure include rotating an inter-prediction residual block with transform skipping, e.g., TU 112, based on a type of boundary at two or more edges of TU 112.

According to the techniques of this disclosure, when a transform is skipped for TU 112, a reposition unit (e.g., reposition unit 66 of video encoder 20 from FIG. 2 or reposition unit 94 of video decoder 30 from FIG. 3) may determine a type of boundary at two or more edges of TU 112, and then determine whether to rotate TU 112 in order to position the residual data at the PU boundaries of the original-version of TU 112 at a top left corner of the rotated-version of TU 112. In some cases, the techniques may only be applied to inter-prediction residual blocks coded using the lossless coding mode or the lossy coding mode in a transform skip mode. In that case, intra-predicted residual blocks coded using the lossless coding mode or the lossy coding mode in the transform skip mode may automatically be rotated by 180 degrees prior to coding the residual data in the residual video blocks. In other cases, the techniques may also be applied to both inter-prediction and intra-prediction residual blocks coded using the lossless coding mode or the lossy coding mode in the transform skip mode.

In some examples, the techniques include determining to either rotate TU 112 by a predetermined rotation value, e.g., 180 degrees, or not rotate TU 112. In other examples, the techniques include determining a rotation value by which to rotate TU 112 from two or more rotation values, e.g., 0 degrees or no rotation, 180 degrees, 90 degrees or 270 degrees. On the encoding side, the rotation is performed to position the residual data with higher energy than average at a top left corner of the rotated-version of TU 112 prior to encoding the residual data of TU 112 to improve entropy coding efficiency. In some cases, the rotations may be performed in the counterclockwise direction on the encoding side. On the decoding side, the rotation is performed to reverse the rotation performed during encoding and return the residual data with higher energy than average to its original position in TU 112 in order to reconstruct a video block from TU 112 using a predictive block. In some cases, the rotations may be performed in the clockwise direction on the decoding side.

In a first example of the techniques of this disclosure, an intra-prediction residual block for which a transform is skipped is automatically rotated by 180 degrees prior to coding the residual data of the residual blocks. Conversely, no rotation is applied for inter-prediction residual blocks, e.g., TU 112, regardless of whether the transform is skipped.

In a second example of the techniques of this disclosure, a residual block may either be rotated by 180 degrees or not rotated, depending on a type of boundary at the edges of the residual block. Limiting rotation to 0 or 180 degrees may be desirable because rotation by 90 degrees or 270 degrees is difficult to implement in hardware because it may require a transpose buffer. In general, if the left and top edges of the residual block are PU boundaries, e.g., TU 110, the residual data in the top left corner is likely to have higher energy than average residual data in TU 110. In that case, a rotation of TU 110 by 180 degrees may not be desirable because the high energy residual data is already concentrated at the top left corner of TU 110. Therefore, a video coding device may determine to not perform rotation of TU 110. If, however, the left and top edges of the residual block are TU boundaries and the right and bottom edges of the residual video block are PU boundaries, then a rotation by 180 degrees may be desirable in order to position the high energy residual data in the top left corner of the rotated-version of the residual block. Therefore, a video coding device may determine to rotate that residual block by 180 degrees.

According to the techniques of this disclosure, a repositioning of a video coding device may classify each edge of a residual block as a PU boundary or a TU boundary. The reposition unit then applies a rule to determine whether to rotate the residual block by 180 degrees. If the number of PU boundaries on the right and bottom edges of the residual block is greater than the number of PU boundaries on the left and top edges of the residual block, the reposition unit determines to rotate the residual block by 180 degrees. Table 1, below, shows the combinations of edge classifications for which the rotation by 180 degrees would be performed. For the remaining combinations, the reposition unit of the video coding device determines to not perform rotation for the residual block. In case where the number of PU boundaries for the left and top edges is equal to the number PU boundaries at the bottom and right edges of the residual block, the reposition unit of the video coding device may determine to either rotate the residual block by 180 degrees or not rotate the residual block.

TABLE 1

| Boundary | | | | |
|---|---|---|---|---|
| Left | Top | Right | Bottom | Rotation |
| TU | TU | PU | PU | 180 degrees |
| TU | TU | TU | PU | 180 degrees |
| TU | TU | PU | TU | 180 degrees |
| TU | PU | PU | PU | 180 degrees |
| PU | TU | PU | PU | 180 degrees |

As an example, the reposition unit of the video coding device may determine whether to rotate the residual block of TU 112, for example, by 180 degrees based on the type of boundary at each edge of TU 112. The reposition unit determines a first number of PU boundaries at a left edge and a top edge of TU 112 to be equal to one PU boundary, i.e., the top edge. The reposition unit also determines a second number of PU boundaries at a right edge and a bottom edge of TU 112 to be equal to two PU boundaries, i.e., both the right edge and the bottom edge. In this case, the second number of PU boundaries is greater than the first number of PU boundaries, so the reposition unit determines to rotate TU 112 by 180 degrees prior to coding the residual data of TU 112.

In a third example of the techniques of this disclosure, a reposition unit of a video coding device may consider up to four possible rotation values for each residual video block, i.e., 0 degrees or no rotation, 180 degrees, 90 degrees, and 270 degrees. In some cases, the reposition unit may only consider two of the rotation values, e.g., 0 degrees and 180 degrees, because rotation by 90 degrees or 270 degrees is difficult to implement in hardware because it may require a transpose buffer. In this example, therefore, only no rotation or rotation by 180 degrees is considered.

After applying each of the rotation values (0, 180, 90, and 270 degrees), the reposition unit calculates the number of PU boundaries at the left and top edges of the residual block for the respective one of the rotation values. Let these numbers of PU boundaries be denoted by $n_0$, $n_{180}$, $n_{90}$, and $n_{270}$. Similarly, after applying each of the rotation values (0, 180, 90, and 270 degrees), the reposition unit calculates the number of PU boundaries at the right and bottom edges of the residual block for the respective one of the rotation values. Let these numbers of PU boundaries be denoted by $m_0$, $m_{180}$, $m_{90}$, and $m_{270}$. The rotations may be performed in the counterclockwise direction on the encoding side, and the rotations may be performed in the clockwise direction on the decoding side.

According to these techniques, the reposition unit of the video coding device then calculates difference values between the number of PU boundaries at the left and top edges of the residual block and the right and bottom edges of the residual block for each of the rotation values, i.e., $d_0=(n_0-m_0)$, $d_{90}=(n_{90}-m_{90})$, $d_{180}=(n_{180}-m_{180})$, and $d_{270}=(n_{270}-m_{270})$. The reposition unit determines the maximum difference value from the difference values $d_0$, $d_{90}$, $d_{180}$, and $d_{270}$ for all the rotation values. The reposition unit of the video coding device then determines to rotate the residual block by the rotation value corresponding to the maximum difference value.

If two or more of the difference values are equal to the maximum difference value, the reposition unit may select the rotation value to be applied to the residual block according to a predetermined order. One example of the predetermined order is: no rotation, rotation by 180 degrees, rotation by 90 degrees, and rotation by 270 degrees. In this example, if $d_0$, $d_{90}$, and $d_{180}$ are all equal to the maximum difference value, no rotation is applied to the residual block. If $d_{90}$ and $d_{180}$ are both equal to the maximum difference value, the rotation value of 180 degrees is applied to the residual block. In other examples, different orders of selecting the rotation in the case of a maximum value tie may be used. Table 2, below, shows two combinations of boundary types for an original residual block and the resulting rotation values for the residual block.

TABLE 2

| Boundary | | | | |
|---|---|---|---|---|
| Left | Top | Right | Bottom | Rotation |
| TU | PU | PU | TU | 90 degrees counterclockwise |
| PU | TU | TU | PU | 270 degrees counterclockwise |

As an example, a reposition unit of a video coder may determine whether to rotate the residual video block of TU 112, for example, by 0 degrees, 180 degrees, 90 degrees counterclockwise, or 270 degrees counterclockwise, based on the type of boundary at each edge of TU 112. The reposition unit determines a first number of PU boundaries at a left edge and a top edge of TU 112 for each of the rotation values such that $n_0=1$, $n_{180}=2$, $n_{90}=2$, and $n_{270}=1$. The reposition unit then determines a second number of PU boundaries at a right edge and a bottom edge of TU 112 for each of the rotation values such that $m_0=2$, $n_{180}=1$, $n_{90}=1$, and $n_{270}=2$.

The reposition unit then calculates a difference value between the first number of PU boundaries and the second number of PU boundaries for each of the rotation values such that $d_0=-1$, $d_{180}=1$, $d_{90}=1$, and $d_{270}=-1$. The reposition unit next determines a maximum difference value from the difference values for all the rotation values of TU 112 to be equal to $d_{180}$ and $d_{90}$, which are both equal to 1. In the case of a tie, the rotation value of 180 degrees is selected over 90 degrees, according to the predetermined order described above. The reposition unit of the video coding device then determines to rotate the residual block by the rotation value with the maximum difference value, which is 180 degrees in this case, prior to coding the residual data in the residual video block.

Figure 5:
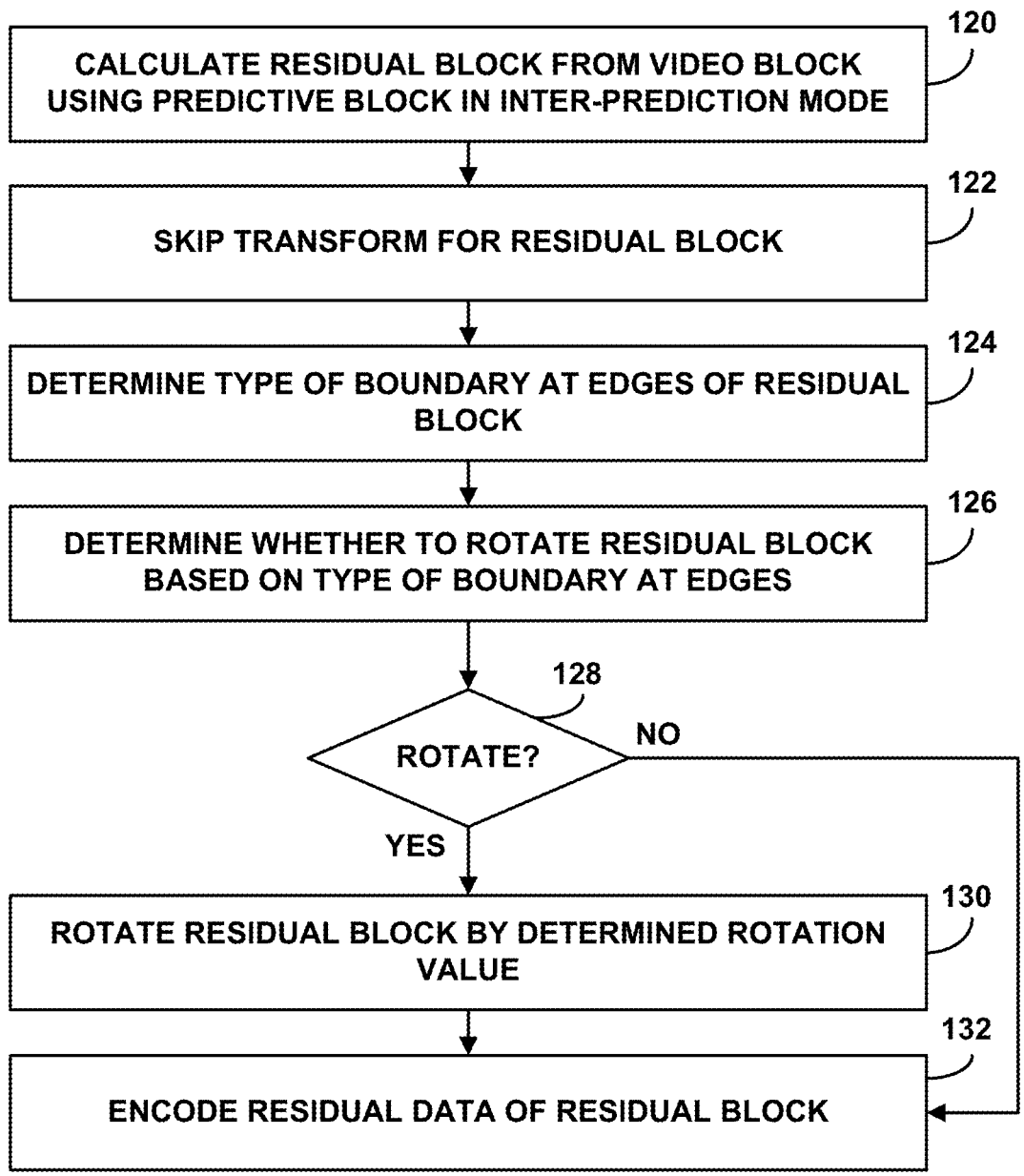
FIG. 5 is a flowchart illustrating an exemplary operation of a video encoder determining whether to rotate a residual block prior to encoding residual data of the residual block.

FIG. 5 is a flowchart illustrating an exemplary operation of a video encoder determining whether to rotate a residual block prior to encoding residual data of the residual block. The operation is described with respect to video encoder 20 from FIG. 2. Video encoder 20 calculates the residual block from a video block using a predictive block from motion compensation unit 44 in the inter-prediction mode (120). In some examples, the residual block may be coded using a lossless coding mode in which both a transform and quantization are always skipped for the residual block. In other examples, the residual block may be coded using a lossy coding mode in a transform skip mode in which only the transform is skipped for the residual block.

In response to selecting to code the residual block using transform skipping, video encoder 20 skips performing the transform for the residual block at transform processing unit 52 (122). As one example, video encoder 20 may encode a syntax element, i.e., cu_transquant_bypass_flag, that indicates whether the residual block is coded using a lossless coding mode in which both a transform and quantization are always skipped for the residual block. In another example, video encoder 20 may encode a syntax element, i.e., transform_skip_flag, indicates whether a transform skip mode is used, in which only the transform is skipped, during coding of the residual block using a lossy coding mode.

According to the techniques, when the transform is skipped for the residual block, reposition unit 66 of video encoder 20 determines a type of boundary at each edge of the residual block (124). The type of boundary at a particular edge of the residual block indicates a level of energy of the residual data typically found at the particular edge of the residual block. Reposition unit 66 then determines whether to rotate the residual block based on the type of boundary at each edge (126). Reposition unit 66 may determine to rotate the residual block in order to position the residual data with higher energy than average at a top left corner of the residual block to improve entropy coding efficiency.

When reposition unit 66 determines to rotate the residual block (YES branch of 128), reposition unit 66 rotates the residual block by a determined rotation value (130). In some cases, described in more detail with respect to FIG. 7, the determined rotation value may be a static, predetermined rotation value, e.g., 180 degrees. In other cases, described in more detail with respect to FIG. 8, reposition unit 66 may determine the rotation value by which to rotate the residual block from a plurality of rotation values. The plurality of rotation values may include 180 degrees, 90 degrees counterclockwise or 270 degrees counterclockwise.

When reposition unit 66 determines to not rotate the residual block (NO branch of 128), reposition unit 66 does not rotate the residual block. Regardless of whether reposition unit 66 rotates the residual block, entropy encoding unit 56 encodes the residual data of the residual block (132). In some cases, e.g., the lossy coding mode in transform skip mode, the residual data of the residual block may be quantized using quantization unit 54 prior to entropy encoding by entropy encoding unit 56. It may also be possible to quantize the residual data of the residual block using quantization unit 54 prior to determining whether to rotate the residual block with reposition unit 66. In other cases, e.g., the lossless coding mode, both the transform and quantization are skipped and the residual data of the residual block is directly entropy encoded by entropy encoding unit 56 without any further compression.

Alternatively, instead of determining the type of boundary at each of the edges of the residual block and determining whether to rotate based on the type of boundary at the edges, reposition unit 66 may determine whether to rotate the residual block based on the number of bits needed to entropy encode the residual block. In this case, reposition unit 66 may apply one or more rotation values to the residual block and determine, for each rotation value, the number of bits needed to entropy encode the quantized residual coefficients included in the rotated residual block. Reposition unit 66 may then determine whether to rotate the residual block based on the rotation value that results in the lowest number of bits for entropy encoding.

In this alternative example, entropy encoding unit 56 may encode syntax elements that indicate whether to rotate the residual block. The video decoder does not have access to identical information to determine whether to rotate or the rotation value for the residual block. The rotation value, therefore, needs to be signaled explicitly in the bitstream. In case of only two possible rotation values, i.e., 0 degrees or no rotation and 180 degrees, one bit is sufficient to signal the rotation value. Entropy encoding unit 56 may CABAC code the bit using a context or in bypass mode. In case of four possible rotation value, i.e., 0 degrees, 180 degrees, 90 degrees counterclockwise, or 270 degrees counterclockwise, two bits may be used to signal the rotation value. Entropy encoding unit 56 may CABAC code the two bits using a context or in bypass mode.

Figure 6:
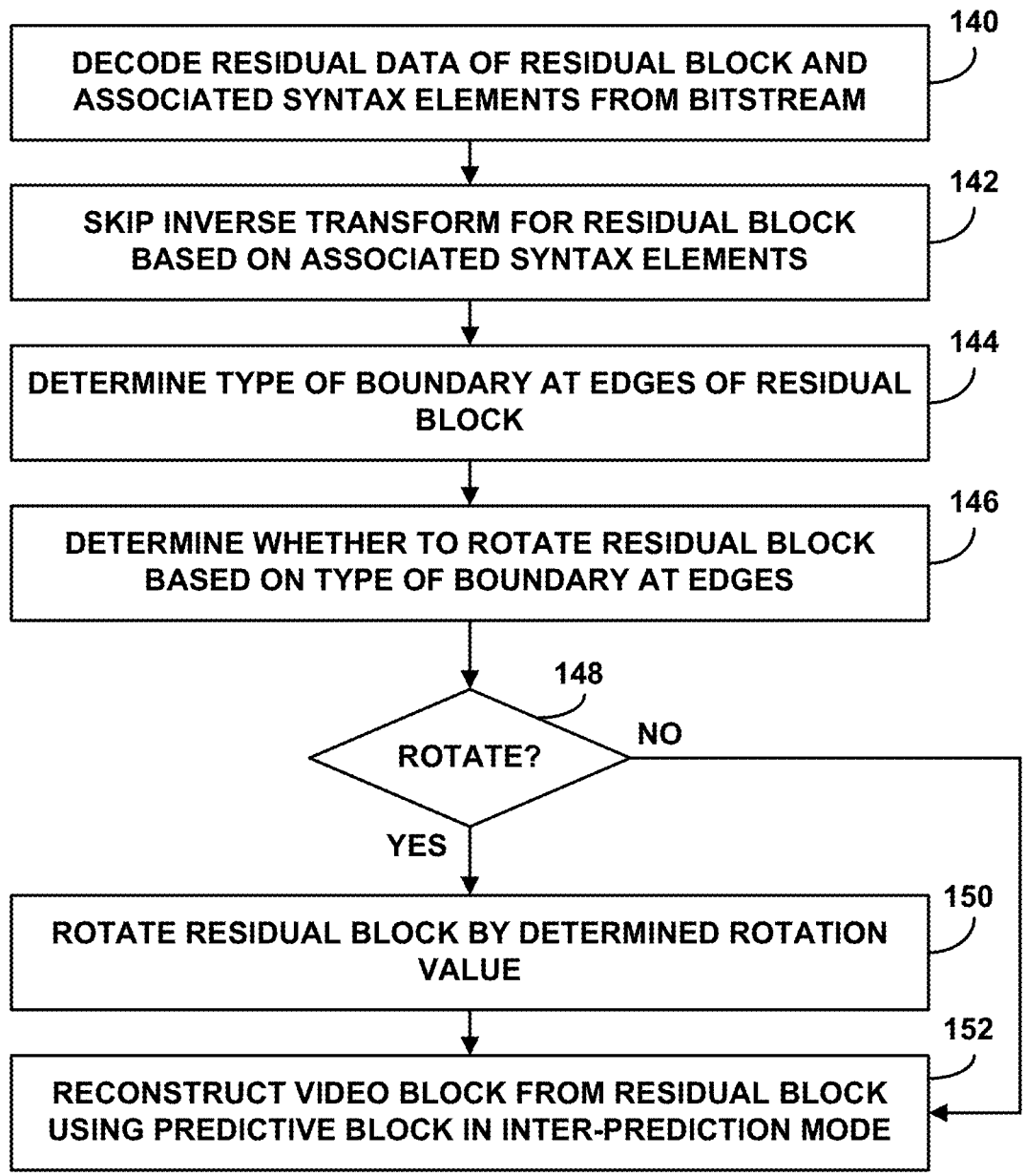
FIG. 6 is a flowchart illustrating an exemplary operation of a video decoder determining whether to rotate a residual block prior to reconstructing a video block from residual data of the residual block.

FIG. 6 is a flowchart illustrating an exemplary operation of a video decoder determining whether to rotate a residual block prior to reconstructing a video block from residual data of the residual block. The operation is described with respect to video decoder 30 from FIG. 3. Entropy decoding unit 80 of video decoder 30 decodes residual data of the residual block and associated syntax elements from a bitstream for a video block received from a video encoder (140). As one example, a syntax element, i.e., cu_transquant_bypass_flag, indicates whether the residual block is coded using a lossless coding mode in which both a transform and quantization are always skipped for the residual block. In another example, a syntax element, i.e., transform_skip_flag, indicates whether a transform skip mode is used, in which only the transform is skipped, during coding of the residual block using a lossy coding mode.

In some cases, e.g., the lossy coding mode in transform skip mode, the residual data of the residual block is inverse quantized using inverse quantization unit 86 prior to rotating the residual block and reconstructing the video block from the residual data of the residual block. It may also be possible to determine whether to rotate the residual block with reposition unit 94 prior to inverse quantizing the residual data of the residual block using inverse quantization unit 86. In other cases, e.g., the lossless coding mode, both inverse quantization and the inverse transform are skipped and the residual data of the residual block is used to directly reconstruct the video block without any further decompression.

Video decoder 30 skips performing the inverse transform for the residual block at inverse transform processing unit 88 based on transform skipping indicated by the associated syntax elements (142). According to the techniques, when the inverse transform is skipped for the residual block, reposition unit 94 of video decoder 30 determines a type of boundary at each edge of the residual block (144). Reposition unit 94 then determines whether to rotate the residual block based on the type of boundary at each edge (146). Reposition unit 94 may determine to rotate the residual block in order to reverse a rotation of the residual block performed during encoding that positioned the residual data with higher energy than average at a top left corner of the residual block to improve entropy coding efficiency.

When reposition unit 94 determines to rotate the residual block (YES branch of 148), reposition unit 94 rotates the residual block by a determined rotation value (150). In some cases, described in more detail with respect to FIG. 7, the determined rotation value may be a static, predetermined rotation value, e.g., 180 degrees. In other cases, described in more detail with respect to FIG. 8, reposition unit 94 may determine the rotation value by which to rotate the residual block from a plurality of rotation values. The plurality of rotation values may include 180 degrees, 90 degrees clockwise or 270 degrees clockwise, e.g., in the case where the video encoder performed rotation in the counterclockwise direction.

When reposition unit 94 determines to not rotate the residual block (NO branch of 148), reposition unit 94 does not rotate the residual block. Regardless of whether reposition unit 94 rotates the residual block, video decoder 30 reconstructs the video block from the residual block using a predictive block from motion compensation unit 82 in the inter-prediction mode (152).

Alternatively, instead of determining the type of boundary at each of the edges of the residual block and determining whether to rotate based on the type of boundary at the edges, reposition unit 94 may determine whether to rotate the residual block based on syntax elements that indicate whether to rotate the residual block by an explicitly signaled rotation value. In this case, the video encoder may determine whether to rotate the residual block based on the number of bits needed to entropy encode the residual block. For example, the video encoder may determine whether to rotate the residual block based on a rotation value that results in the lowest number of bits for entropy encoding, and explicitly signal the rotation value to video decoder 30.

In this alternative example, entropy decoding unit 80 may decode syntax elements that indicate whether to rotate the residual block. Video decoder 30 does not have access to identical information as the video encoder to determine whether to rotate or the rotation value for the residual block. The rotation value, therefore, needs to be signaled explicitly in the bitstream. In case of only two possible rotation values, i.e., 0 degrees or no rotation and 180 degrees, one bit is sufficient to signal the rotation value. Entropy decoding unit 80 may CABAC code the bit using a context or in bypass mode. In case of four possible rotation value, i.e., 0 degrees, 180 degrees, 90 degrees clockwise, or 270 degrees clockwise, two bits may be used to signal the rotation value. Entropy decoding unit 80 may CABAC code the two bits using a context or in bypass mode.

Figure 7:
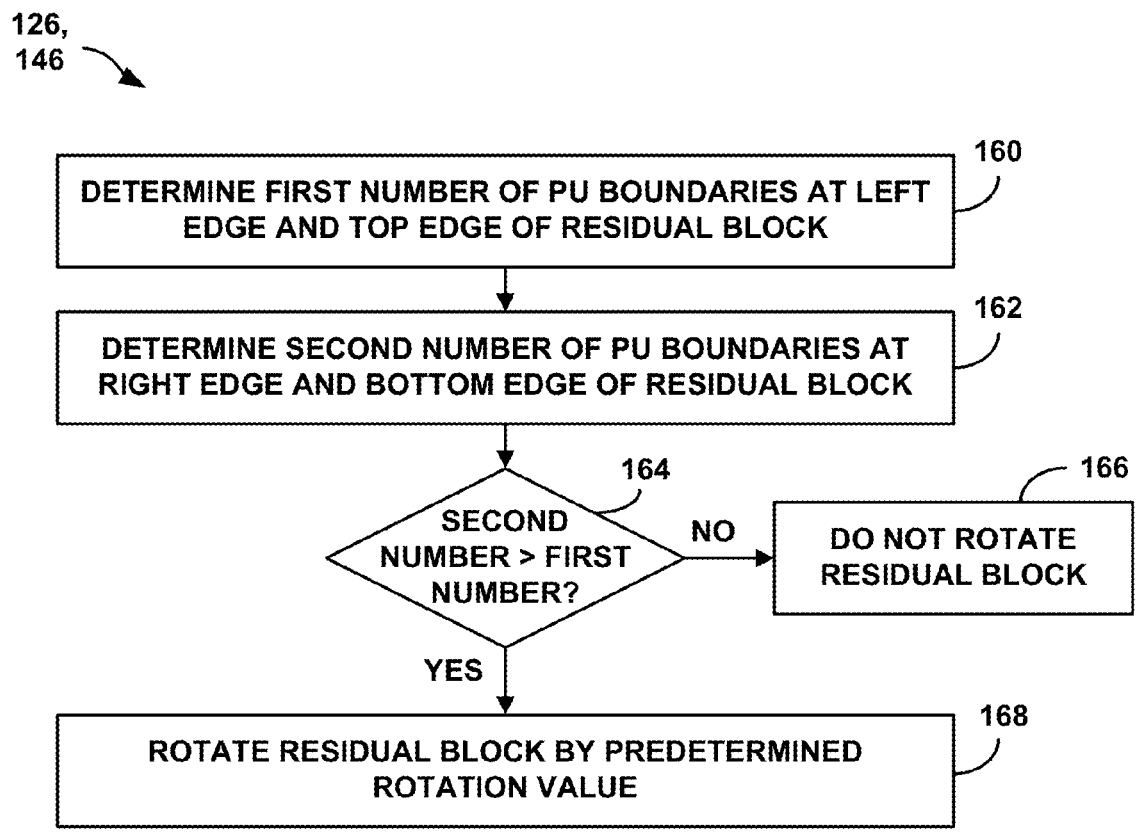
FIG. 7 is a flowchart illustrating one example operation of determining whether to rotate a residual block by a predetermined rotation value based on a type of boundary at edges of the residual block.

FIG. 7 is a flowchart illustrating one example operation of determining whether to rotate a residual block by a predetermined rotation value based on a type of boundary at edges of the residual block. The illustrated operation is a more detailed example of step 126 from FIGS. 5 and 146 from FIG. 6 of determining whether to rotate the residual block based on the type of boundary at the edges.

When a transform is skipped for the residual block, e.g., a lossless coding mode or a lossy coding mode in a transform skip mode, entropy coding efficiency may be improved by rotating the residual block during encoding in order to position the residual data with higher energy than average at a top left corner of the residual block. During decoding, the rotation performed during encoding needs to be reversed in order to properly reconstruct the video block from the residual block using a predictive block in the inter-prediction mode.

In the inter-prediction mode, if a particular edge of the residual block is a TU boundary between two TUs within the same PU, residual data at the TU boundary of the residual block typically has lower energy than average residual data in the residual block. Further, if a particular edge of the residual block is a PU boundary between two TUs in different PUs, residual data at the PU boundary of the residual block typically has higher energy than average residual data in the residual block. Based on this observation, the techniques illustrated in FIG. 7 use the type of boundary at the edges of the residual block to determine whether to rotate the residual block by a predetermined rotation value, e.g., 180 degrees, to position the residual data at the PU boundaries of the original residual block at a top left corner of the rotated residual block. On the encoding side, this rotation positions the residual data with higher energy than average at a top left corner of the rotated residual block to improve entropy coding efficiency. On the decoding side, this rotation reverses the rotation performed during encoding and returns the residual data with higher energy than average to its original position in the original residual block.

The operation illustrated in FIG. 7 will be described with respect to reposition unit 66 of video encoder 20 from FIG. 2. In other examples, the same operation may also be performed by reposition unit 94 of video decoder 30 from FIG. 3. In the illustrated operation, reposition unit 66 may either rotate the residual block by the predetermined rotation value, e.g., 180 degrees, or not rotate the residual block. In order to determine whether to rotate the residual block, reposition unit 66 determines a first number of PU boundaries at a left edge and a top edge of the residual block (160).

Reposition unit 66 also determines a second number of PU boundaries at a right edge and a bottom edge of the residual block (162).

If the second number of PU boundaries is greater than the first number of PU boundaries (YES branch of 164), the residual data with higher energy than average is likely concentrated at a bottom right corner of the residual block. In this case, reposition unit 66 rotates the residual block by the predetermined rotation value (168). Rotating the residual block by 180 degrees, for example, will position the residual data with higher energy than average at a top left corner of the rotated residual block. On the other hand, if the second number of PU boundaries is less than or equal to the first number of PU boundaries (NO branch of 164), the residual data with higher energy than average is likely already concentrated at the top left corner of the residual block. In that case, reposition unit 66 does not rotate the residual block (166).

Figure 8:
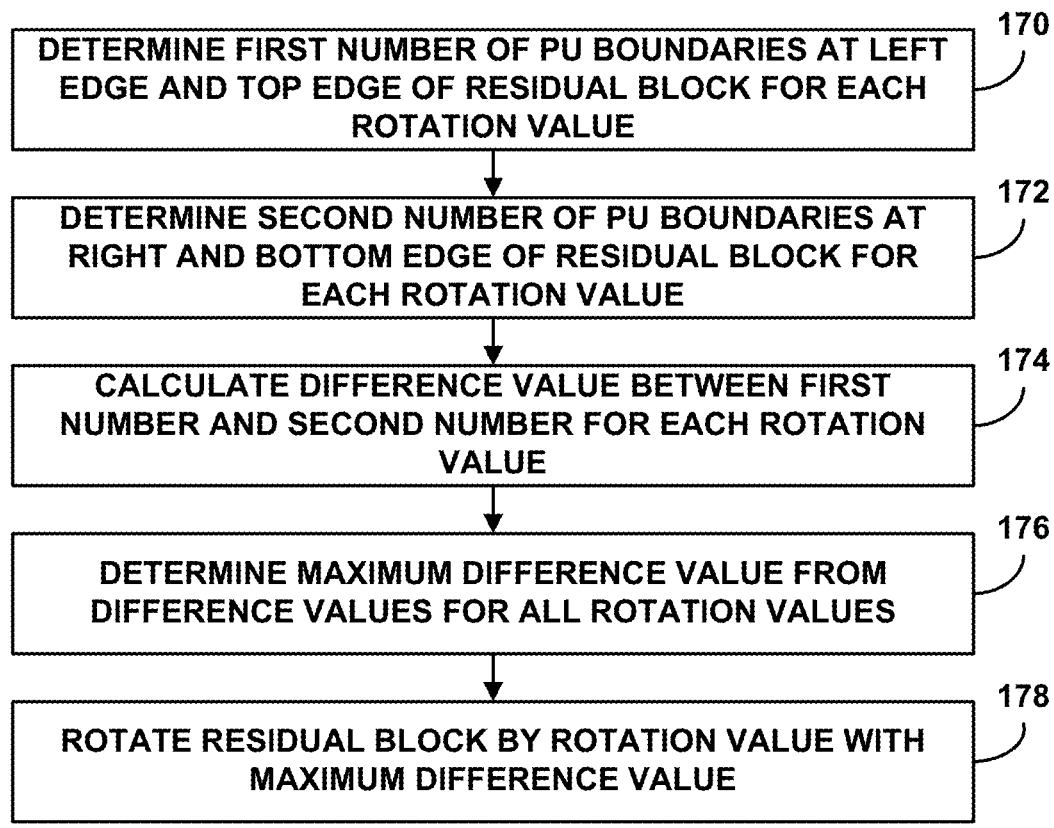
FIG. 8 is a flowchart illustrating another example operation of determining whether to rotate a residual block including determining a rotation value for the residual block based on a type of boundary at edges of the residual block for each of two or more possible rotation values.

FIG. 8 is a flowchart illustrating another example operation of determining whether to rotate a residual block including determining a rotation value for the residual block based on a type of boundary at edges of the residual block for each of two or more possible rotation values. The illustrated operation is another more detailed example of step 126 from FIGS. 5 and 146 from FIG. 6 of determining whether to rotate the residual block based on the type of boundary at the edges.

When a transform is skipped for the residual block, e.g., a lossless coding mode or a lossy coding mode in a transform skip mode, entropy coding efficiency may be improved by rotating the residual block during encoding in order to position the residual data with higher energy than average at a top left corner of the residual block. During decoding, the rotation performed during encoding needs to be reversed in order to properly reconstruct the video block from the residual block using a predictive block in the inter-prediction mode.

In the inter-prediction mode, if a particular edge of the residual block is a TU boundary between two TUs within the same PU, residual data at the TU boundary of the residual block typically has lower energy than average residual data in the residual block. Further, if a particular edge of the residual block is a PU boundary between two TUs in different PUs, residual data at the PU boundary of the residual block typically has higher energy than average residual data in the residual block. Based on this observation, the techniques illustrated in FIG. 8 use the type of boundary at the edges of the residual block to determine a rotation value by which to rotate the residual block, e.g., 0, 180, 90 or 270 degrees, to position the residual data at the PU boundaries of the original residual block at a top left corner of the rotated residual block. On the encoding side, this rotation positions the residual data with higher energy than average at a top left corner of the rotated residual block to improve entropy coding efficiency. On the decoding side, this rotation reverses the rotation performed during encoding and returns the residual data with higher energy than average to its original position in the original residual block.

The operation illustrated in FIG. 8 will be described with respect to reposition unit 66 of video encoder 20 from FIG. 2. In other examples, the same operation may also be performed by reposition unit 94 of video decoder 30 from FIG. 3. In the illustrated operation, reposition unit 66 may rotate the residual block by a rotation value selected from a plurality of rotation values. In some cases, the rotation values may include 0 degrees, i.e., no rotation, and 180 degrees. In other cases, the rotation values may include 0 degrees, 180 degrees, 90 degrees and 270 degrees. As an example, on the encoding side, the rotation values may be in a counterclockwise direction, and, on the decoding side, the rotation values may be in a clockwise direction In order to determine the rotation value by which to rotate the residual block, reposition unit 66 determines a first number of PU boundaries at a left edge and a top edge of the residual block for each of the rotation values (170). Reposition unit 66 also determines a second number of PU boundaries at a right edge and a bottom edge of the residual block for each of the rotation values (172). Reposition unit 66, therefore, performs each of the possible rotations of the residual block and determines the location and number of PU boundaries at each of the rotations.

Reposition unit 66 calculates a difference value between the first number and the second number for each of the rotation values (174). In this way, reposition unit 66 determines where the residual data with higher energy than average is likely concentrated in the residual block after each of the rotations is performed. Reposition unit 66 then determines a maximum difference value from the calculated difference values for all of the rotation values (176). In order to maximize the concentration of residual data with higher energy than average at a top left corner of the residual block, rotation unit 66 selects the one of the rotation values associated with the maximum difference value. Reposition unit 94 then rotates the residual block by the rotation value with the maximum difference value (178).

Figure 9:
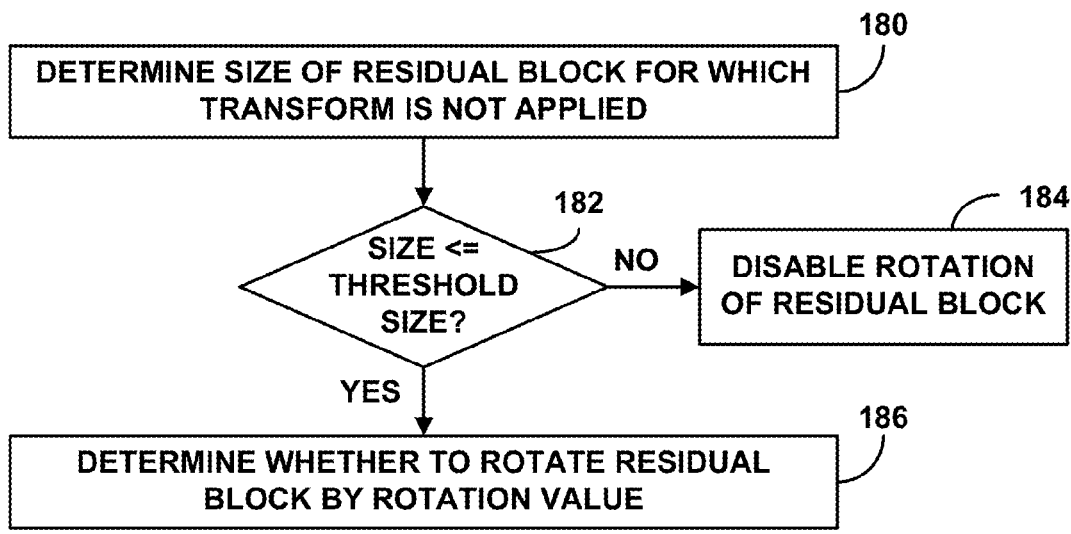
FIG. 9 is a flowchart illustrating an example operation of restricting block sizes of residual blocks for which rotation can be performed when a transform is not applied to the residual blocks.

FIG. 9 is a flowchart illustrating an example operation of restricting block sizes of residual blocks for which rotation can be performed when a transform is not applied to the residual blocks. The illustrated operation in FIG. 9 will be described with respect to reposition unit 66 of video encoder 20 from FIG. 2. In other examples, the same operation may also be performed by reposition unit 94 of video decoder 30 from FIG. 3. The illustrated operation may be applied to both intra-prediction residual blocks and inter-prediction residual blocks in both the lossy coding mode and the lossless coding mode.

The techniques described above include rotating a residual block by a determined rotation value when a transform is skipped or bypassed for the residual block. The above techniques describe performing the rotation for both inter-prediction residual blocks and intra-prediction residual blocks that are coded using either the lossy coding mode with the transform skip mode or the lossless coding mode in which both the transform and quantization processes are bypassed.

In the lossy coding mode, a transform skip mode may be applied to all residual block sizes. In the lossless coding mode, a transform is bypassed for all residual block sizes. A rotation, therefore, may be performed for all residual block sizes in both the intra-prediction mode and the inter-prediction mode. Performing rotation for large size residual blocks, such as 16×16 or 32×32 blocks, however, may be difficult for hardware implementations. According to the techniques of this disclosure, rotating residual data of residual blocks for which a transform is not applied may be restricted to residual block sizes that are less than or equal to a threshold size. Determining whether to rotate the residual block, therefore, may depend on the cu_transquant_bypass_flag indicating the lossless coding mode, the transform skip flag indicating the transform skip mode in the lossy coding mode, and a size of the residual block.

In the operation illustrated in FIG. 9, reposition unit 66 receives a residual block when a transform is not applied to the residual block, i.e., the residual block is coded using the lossless coding mode or the lossy coding mode in a transform skip mode. The techniques of this disclosure include restricting the size of residual blocks for which rotation can be performed in both the lossy coding mode and the lossless coding mode.

In this case, in order to determine whether to rotate the residual block, reposition unit 66 determines a size of the residual block for which a transform is not applied (180). If the size of the residual block is less than or equal to a threshold block size (YES branch of 182), then reposition unit 66 determines whether to rotate the residual block by a determined rotation value (186). If the size of the residual block is greater than the threshold size (NO branch of 182), reposition unit 66 disables rotation and does not rotate the residual block (184). The rotation determination may be performed by one of the operations described in more detail above. In some examples, if the residual block is an intra-prediction residual block, the rotation will always be applied when the block size of the residual block satisfies the threshold block size criterion. In some cases, the rotation of the residual block may be limited to 180 degrees. In other cases, the rotation of the residual block may be determined to be one of 0 degrees, 90 degrees, 180 degrees or 270 degrees according to the techniques described above. In other examples, if the residual block is an inter-prediction residual block or an intra block copying (BC) prediction residual block, the rotation may be disabled.

In one example, the threshold size for performing rotation of the residual blocks in both the lossy coding mode and the lossless coding mode is 8×8. In other examples, the threshold size may be equal to 4×4. In some cases, the rotation may only be applied to intra-prediction residual blocks in either the lossy coding mode or the lossless coding mode that satisfy the threshold block size criterion, and the rotation may be disabled for inter-prediction residual blocks regardless of block size. In some cases, the rotation may also be disabled for intra BC prediction residual blocks regardless of block size. In other cases, the rotation may be applied to both intra-prediction and inter-prediction residual blocks in either the lossy coding mode or the lossless coding mode that satisfy the threshold block size criterion (i.e., the residual block size is less than or equal to the threshold block size). In another case, the rotation may be applied to only intra-prediction residual blocks in the lossy coding mode with transform skipping that satisfy the threshold block size criterion, and to both intra-prediction and inter-prediction residual blocks in the lossless coding mode that satisfy the threshold block size criterion.

In another example, the transform skip mode may be restricted to apply only to residual blocks in the lossy coding mode having sizes up to a maximum block size, e.g., 4×4 or 8×8. The maximum block size for which the transform is permitted to be skipped in the lossy coding mode may be indicated in one of a SPS and a PPS associated with the residual block. In this case, the threshold size for performing rotation of the residual blocks in both the lossy coding mode and the lossless coding mode is less than or equal to a maximum block size for which a transform can be skipped in the lossy coding mode, e.g., 4×4 or 8×8. Setting the threshold block size to be less than or equal to the maximum block size for which a transform can be skipped in the lossy coding mode aligns the block sizes for which rotation can be performed for both lossless and lossy coding mode cases.

In some cases, the rotation may only be applied to intra-prediction residual blocks in either the lossy coding mode or the lossless coding mode that satisfy the threshold block size criterion, and the rotation may be disabled for inter-prediction residual blocks regardless of block size. In some cases, the rotation may also be disabled for intra BC prediction residual blocks regardless of block size. In other cases, the rotation may be applied to both intra-prediction and inter-prediction residual blocks in either the lossy coding mode or the lossless coding mode that satisfy the threshold block size criterion. In another case, the rotation may be applied to only intra-prediction residual blocks in the lossy coding mode with transform skipping that satisfy the threshold block size criterion, and to both intra-prediction and inter-prediction residual blocks in the lossless coding mode that satisfy the threshold block size criterion.

Figure 10:
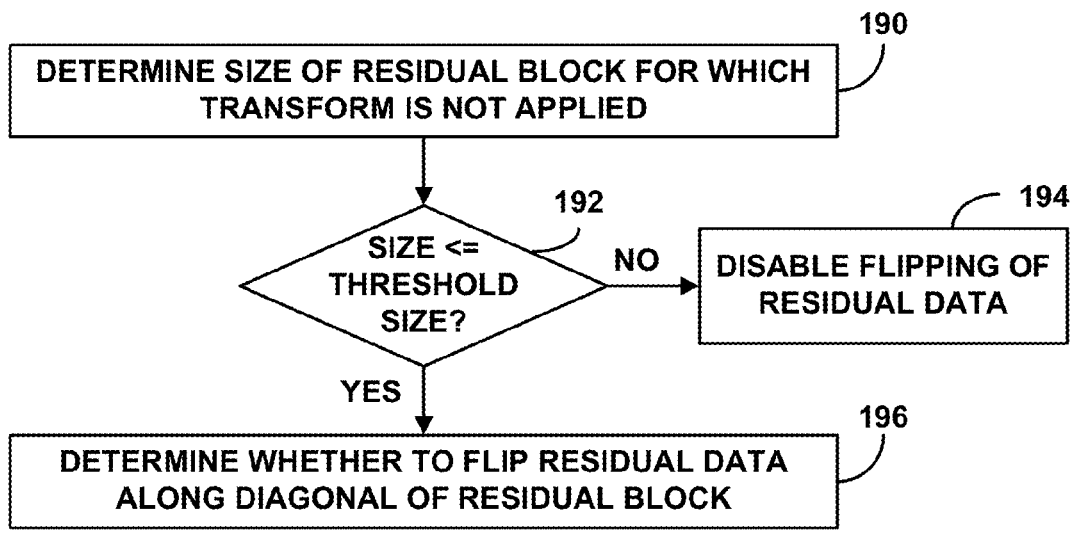
FIG. 10 is a flowchart illustrating an example operation of restricting block sizes of residual blocks for which flipping of residual data sample values along a diagonal can be performed when a transform is not applied to the residual blocks.

FIG. 10 is a flowchart illustrating an example operation of restricting block sizes of residual blocks for which flipping of residual data sample values along a diagonal can be performed when a transform is not applied to the residual blocks. The illustrated operation in FIG. 10 will be described with respect to reposition unit 66 of video encoder 20 from FIG. 2. In other examples, the same operation may also be performed by reposition unit 94 of video decoder 30 from FIG. 3. The illustrated operation may be applied to both intra-prediction residual blocks and inter-prediction residual blocks in both the lossy coding mode and the lossless coding mode.

The techniques described above that apply to the rotation of a residual block may also apply to flipping residual data sample values of the residual block. As discussed above, JCTVC-K0294 proposed that, depending on the scan being used, sample values of an intra prediction residual block may be flipped along the main diagonal or the anti-diagonal of the residual block when a transform is skipped for the residual block. The criterion for when a rotation can be performed for a residual block, described above with respect to FIG. 9, can also be applied to determine when flipping of the prediction residual values can be performed.

When the residual data sample values of a residual block are flipped, the sample values on one side of a diagonal swap places with sample values at corresponding mirror image locations on the other side of the diagonal of the residual block. In some examples, flipping the sample values of the residual block may include mirroring the sample values across the main diagonal of the residual block, i.e., the diagonal line from the top-left corner to the bottom-right corner of the residual block. In other examples, flipping the sample value of the residual block may include mirroring the sample values across the anti-diagonal of the residual block, i.e., the diagonal line from the bottom-left corner to the top-right corner of the residual block. In some cases, the sample values of the residual block will be flipped about the main diagonal when either a horizontal or a vertical scanning mode is selected for the transform-skipped residual block. In other cases, the sample values of the residual block will be flipped about the anti-diagonal when a diagonal scanning mode is selected for the transform-skipped residual block.

In the lossy coding mode, a transform skip mode may be applied to all residual block sizes. In the lossless coding mode, a transform is bypassed for all residual block sizes. Flipping, therefore, may be performed for all residual block sizes in both the intra-prediction mode and the inter-prediction mode. According to the techniques of this disclosure, flipping residual data of residual blocks for which a transform is not applied may be restricted to residual block sizes that are less than or equal to a threshold size. Determining whether to flip the residual block, therefore, may depend on the cu_transquant_bypass_flag indicating the lossless coding mode, the transform skip flag indicating the transform skip mode in the lossy coding mode, and a size of the residual block.

In the operation illustrated in FIG. 10, reposition unit 66 receives a residual block when a transform is skipped for the residual block, i.e., the residual block is coded using the lossless coding mode or the lossy coding mode in a transform skip mode. The techniques of this disclosure include restricting the size of residual blocks for which flipping can be performed in both the lossy coding mode and the lossless coding mode.

In this case, in order to determine whether to flip the residual block, reposition unit 66 determines a size of the residual block for which a transform is not applied (190). If the size of the residual block is less than or equal to a threshold block size (YES branch of 192), then reposition unit 66 determines whether to flip the residual data sample values along a diagonal of the residual block (196). If the size of the residual block is greater than the threshold size (NO branch of 192), reposition unit 66 disables flipping and does not flip the residual data sample values of the residual block (194). The residual data sample values may be flipped along a main diagonal, i.e., top-left to bottom-right, or along an anti-diagonal, i.e., bottom-left to top-right, of the residual block.

In one example, the threshold size for flipping residual data of the residual blocks in both the lossy coding mode and the lossless coding mode is 8×8. In other examples, the threshold size may be equal to 4×4. In some cases, flipping may only be applied to intra-prediction residual blocks in either the lossy coding mode or the lossless coding mode that satisfy the threshold block size criterion, and the rotation may be disabled for inter-prediction residual blocks regardless of block size. In some cases, flipping may also be disabled for intra BC prediction residual blocks regardless of block size. In other cases, flipping may be applied to both intra-prediction and inter-prediction residual blocks in either the lossy coding mode or the lossless coding mode that satisfy the threshold block size criterion (i.e., the residual block size is less than or equal to the threshold block size). In another case, flipping may be applied to only intra-prediction residual blocks in the lossy coding mode with transform skipping that satisfy the threshold block size criterion, and to both intra-prediction and inter-prediction residual blocks in the lossless coding mode that satisfy the threshold block size criterion.

In another example, the transform skip mode may be restricted to apply only to residual blocks in the lossy coding mode having sizes up to a maximum block size, e.g., 4×4 or 8×8. The maximum block size for which the transform is permitted to be skipped in the lossy coding mode may be indicated in one of a SPS and a PPS associated with the residual block. In this case, the threshold size for flipping residual data of the residual blocks in both the lossy coding mode and the lossless coding mode is less than or equal to a maximum block size for which a transform can be skipped in the lossy coding mode, e.g., 4×4 or 8×8. Setting the threshold block size to be less than or equal to the maximum block size for which a transform can be skipped in the lossy coding mode aligns the block sizes for which flipping can be performed for both lossless and lossy coding mode cases.

In some cases, flipping may only be applied to intra-prediction residual blocks in either the lossy coding mode or the lossless coding mode that satisfy the threshold block size criterion, and the rotation may be disabled for inter-prediction residual blocks regardless of block size. In some cases, flipping may also be disabled for intra BC prediction residual blocks regardless of block size. In other cases, flipping may be applied to both intra-prediction and inter-prediction residual blocks in either the lossy coding mode or the lossless coding mode that satisfy the threshold block size criterion. In another case, flipping may be applied to only intra-prediction residual blocks in the lossy coding mode with transform skipping that satisfy the threshold block size criterion, and to both intra-prediction and inter-prediction residual blocks in the lossless coding mode that satisfy the threshold block size criterion.

Figure 11B:
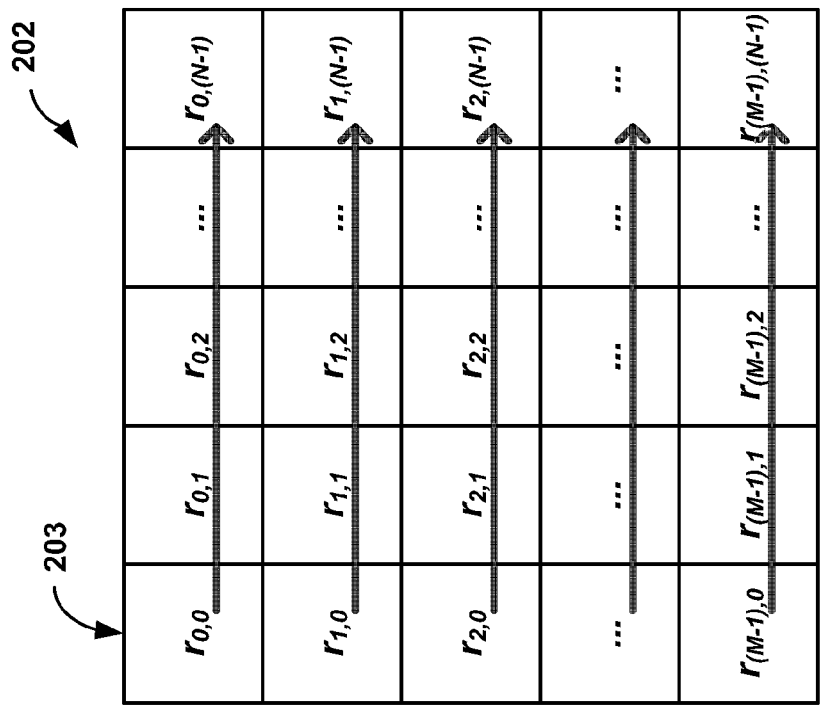
FIGS. 11A and 11B are conceptual diagrams illustrating residual blocks coded using Residual Differential Pulse Code Modulation (RDPCM).
Figure 11A:
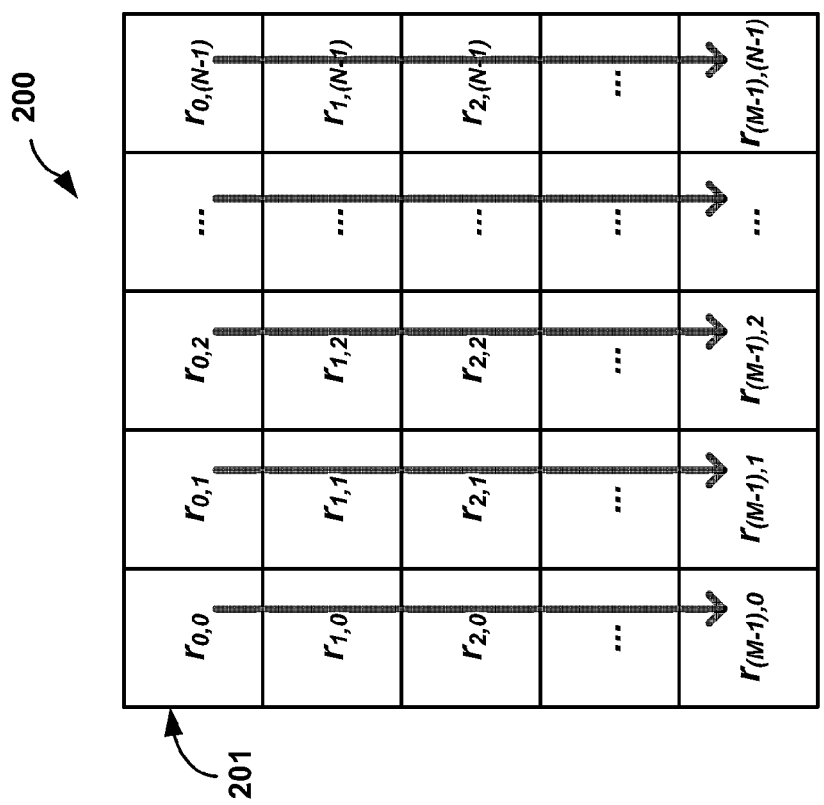

FIGS. 11A and 11B are conceptual diagrams illustrating residual blocks 200 and 202, respectively, coded using Residual Differential Pulse Code Modulation (RDPCM). In one example, a video coding standard may support transform skip intra-prediction blocks and transform skip inter-prediction blocks using Residual Differential Pulse Code Modulation (RDPCM) in the horizontal or vertical direction. The basic idea behind RDPCM is to apply DPCM techniques to predict residual data with a residual block by using an upper row pixel to predict a current pixel in the vertical mode and to use the left column pixel for predicting the current pixel in the horizontal mode. Each of residual blocks 200 and 202 are of size M (rows)×N (cols) and include residual data pixels $r_{i,j}$, where $0 \le i \le (M-1)$ and $0 \le j \le (N-1)$.

When decoding residual blocks in the lossy coding mode using RDPCM, the following order of operations may be followed in video decoder 30 from FIG. 3: rotation or flipping performed by reposition unit 94, inverse quantization performed by inverse quantization unit 86, inverse transform skipping, and inverse RDPCM. When encoding residual blocks in the lossy coding mode using RDPCM, the following order of operations may be followed in video encoder 20 from FIG. 2: RDPCM, transform skipping, quantization performed by quantization unit 54, and rotation or flipping performed by reposition unit 66. When decoding residual blocks in the lossless coding mode using RDPCM, the following order of operations may be followed in video decoder 30 from FIG. 3: rotation or flipping performed by reposition unit 94, inverse quantization and inverse transform bypass, and inverse RDPCM. When encoding residual blocks in the lossless coding mode using RDPCM, the following order of operations may be followed in video encoder 20 from FIG. 2: RDPCM, transform and quantization bypass, and rotation or flipping performed by reposition unit 66.

FIG. 11A illustrates a vertical inter RDPCM mode applied to residual block 200. In the vertical inter RDPCM mode, residual data in a first row 201 of residual block 200 is unchanged (i.e., not predicted from any other row), whereas the later rows of the residual data of residual block 200 are predicted from the row above. After vertical inter RDPCM, the residual data in the first row 201 tends to have more or higher energy compared to other rows of the residual data in residual block 200. If residual block 200 is rotated, e.g., by 180 degrees, after vertical inter RDPCM, the bottom-most row of the residual data of residual block 200 tends to have more or higher energy/magnitude than the other rows of the residual data.

FIG. 11B illustrates a horizontal inter RDPCM mode applied to residual block 202. In the horizontal inter RDPCM mode, residual data in a left-most column 203 of residual block 202 is unchanged (i.e., not predicted from any other column), whereas the later columns of the residual data of residual block 202 are predicted from the left column. After horizontal inter RDPCM, the residual data in the left-most column 203 tends to have more or higher energy compared to other columns of the residual data in residual block 202. If residual block 202 is rotated, e.g., by 180 degrees, after horizontal inter RDPCM, the right-most row of the residual data of residual block 202 tends to have more or higher energy/magnitude than the other rows of the residual data.

For inter RDPCM, the prediction direction (no RDPCM, horizontal, vertical) may be explicitly signaled to video decoder 30. For example, video encoder 20 may include one or more syntax elements in an encoded bitstream indicating the RDPCM mode for a particular block (or blocks) of video data. Video decoder 30 may receive the one or more syntax elements and perform the RDPCM in a reciprocal manner.

As described above, in HEVC, entropy coding is designed for transform coding. The lower frequency transform coefficients typically have higher energy. The transform coefficients are scanned and entropy coded from the bottom-right to top-left of a video block. Thus, the video encoder or video decoder expects the initial coefficients in the scan at the bottom-right corner of the video block to have smaller energy than later coefficients in the scan order. After an inter RDPCM block is rotated, however, the initial coefficients in the scan at the bottom-right corner of the video block tend to have more or higher energy than later coefficients in the scan order, thereby resulting in a worse coding performance (i.e., more bits needed for entropy coding).

The techniques of this disclosure include selectively disabling (i.e., not applying) repositioning of residual data for inter RDPCM residual blocks. More specifically, for a residual block in either the inter-prediction mode or the intra-prediction mode using RDPCM in the horizontal or vertical direction, the residual block may not be rotated prior to coding the residual data of the residual block. In some examples, the techniques of disabling rotation, i.e., not rotating the residual block prior to coding the residual data, for certain prediction modes may be applied to only lossy coding with transform skipping, only lossless coding, or both lossy coding with transform skipping and lossless coding.

Figure 12:
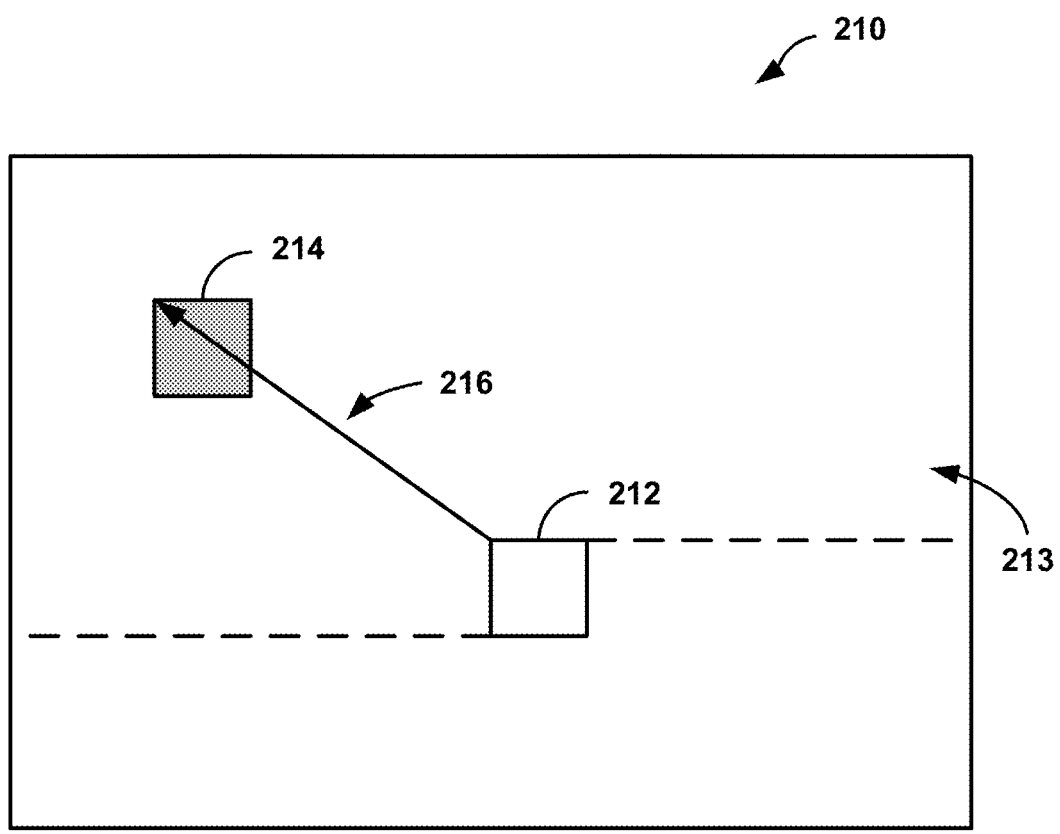
FIG. 12 is a conceptual diagram illustrating a current picture including a current block being predicted based on a previously coded block in the same picture using an intra block copying prediction mode.

FIG. 12 is a conceptual diagram illustrating a current picture 210 including a current block 212 being predicted based on a previously coded block 214 in the same picture 210 using an intra block copying (intra BC) prediction mode. In one example, a video coding standard may include the intra BC prediction mode as one of the prediction modes. Video content in certain applications, such as remote desktop, remote gaming, wireless displays, automotive infotainment, cloud computing, and the like, typically includes a combination of natural content and screen content, where screen content may include, for example text and artificial graphics. In screen content regions, repeated patterns (such as characters, icons, symbols, etc.) often exist. The intra BC prediction mode is a dedicated technique that removes this kind of redundancy and improves intra-prediction coding efficiency for screen content.

As illustrated in FIG. 12, for a current video block 212 using the intra BC prediction mode, the prediction signals are obtained from a previously coded video block 214 in a reconstructed region 213 of the current picture 210. An offset or displacement vector (i.e., a motion vector) 216 indicates the position of the prediction signals in the previously coded video block 214 displaced from the position of the sample to be predicted in current video block 212. As an example, video encoder 20 may encode motion vector 216 together with the residual signals as the difference between current video block 212 and the prediction signals of video block 214. Video decoder 30 may then decode current video block 212 based on motion vector 216 and the residual signals received from video encoder 20.

In some examples, inter RDPCM may be applied to blocks that are coded using the intra BC prediction mode. As in the case of inter RDPCM, video encoder 20 or video decoder 30 may predict residual data from the intra BC prediction blocks using three modes, including RDPCM-off, RDPCM-horizontal and RDPCM-vertical. This extension may be applied for both lossless and lossy cases.

The techniques of this disclosure include selectively disabling (i.e., not applying) repositioning of residual data of residual blocks in the intra BC prediction mode. In addition, for a residual block in any of the inter-prediction mode, the intra-prediction mode or the intra BC prediction mode using RDPCM in the horizontal or vertical direction, the residual block may not be rotated prior to coding the residual data of the residual block.

In some examples, the techniques of disabling repositioning for certain prediction modes may be applied to only lossy coding with transform skipping, only lossless coding, or both lossy coding with transform skipping and lossless coding. In another example, repositioning may be disabled (i.e., not applied) for all inter-prediction mode blocks and all intra BC prediction mode blocks. This criteria may be combined with other criteria of whether coding is lossy with transform skipping or lossless to determine whether repositioning may be applied.

This disclosure generally describes techniques for coding residual data of a prediction residual block in either a lossy coding mode or a lossless coding mode, in which a transform is skipped or bypassed. According to the techniques of this disclosure, video encoder 20 or video decoder 30 determine whether to reposition residual data of a residual block based on a prediction mode of the residual block, e.g., the intra-prediction mode, the inter-prediction, or the intra block copying prediction mode, and a size of the residual block. In some examples, the techniques disable repositioning of the residual data for all residual blocks in the inter-prediction mode and the intra BC prediction mode. In other examples, the techniques determine to reposition residual blocks in the intra-prediction mode when the residual blocks have block sizes that are less than or equal to a threshold size for both the lossy coding mode and the lossless coding mode, as described above.

Figure 13:
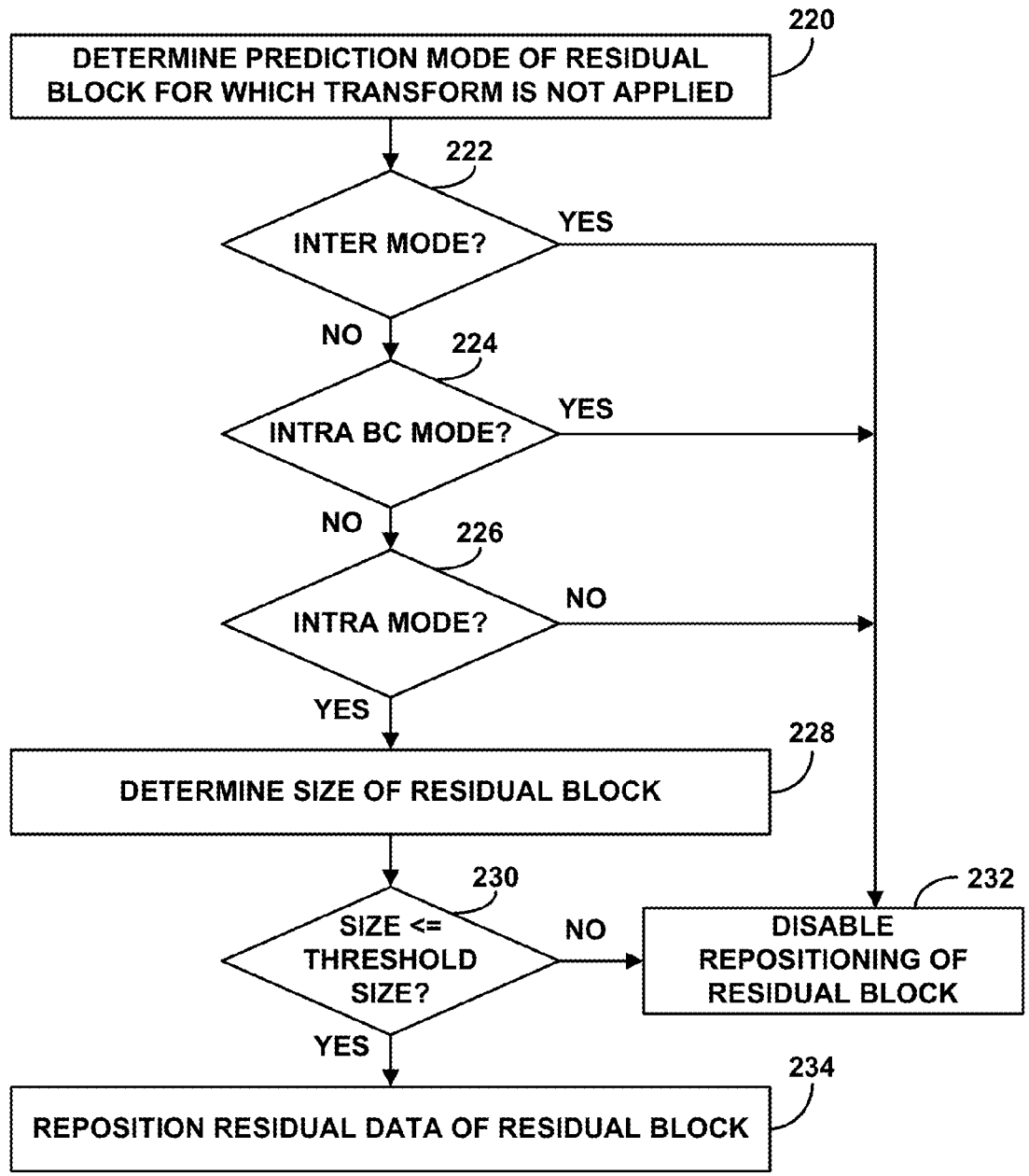
FIG. 13 is a flowchart illustrating an example operation of determining whether to reposition residual data of a residual block for which a transform is not applied based on a prediction mode of the residual block and a size of the residual block.

FIG. 13 is a flowchart illustrating an example operation of determining whether to reposition residual data of a residual block for which a transform is not applied based on a prediction mode of the residual block and a size of the residual block. The illustrated operation in FIG. 13 will be described with respect to reposition unit 66 of video encoder 20 from FIG. 2. In other examples, the same operation may also be performed by reposition unit 94 of video decoder 30 from FIG. 3. The illustrated operation may be applied to all residual blocks in both the lossy coding mode and the lossless coding mode.

The techniques described above include rotating a residual block by a determined rotation value or flipping residual data along a diagonal of the residual block when a transform is not applied to the residual block. The above techniques describe repositioning residual data for both inter-prediction residual blocks and intra-prediction residual blocks that are coded using either the lossy coding mode in the transform skip mode or the lossless coding mode in which both the transform and quantization processes are bypassed.

According to an example video coding standard, such as the Range Extensions of HEVC, in the lossy coding mode, a transform skip mode may be applied to residual blocks of any size. In the lossless coding mode, transform and quantization procedures are bypassed for all residual blocks. In both the lossy coding mode and the lossless coding mode, therefore, the transform may be skipped or bypassed for all block sizes. Repositioning, e.g., rotating or flipping, therefore, may be performed for all residual block sizes in both the intra-prediction mode and the inter-prediction mode. In some examples, in the lossy coding mode, the transform skip mode may be restricted to apply only to residual blocks having sizes up to a maximum block size, e.g., 4×4 or 8×8. The maximum block size for which the transform is permitted to be skipped in the lossy coding mode may be indicated in one of a SPS and a PPS associated with the residual block.

In the operation illustrated in FIG. 13, reposition unit 66 receives a residual block when a transform is not applied to the residual block, i.e., the residual block is coded using the lossless coding mode or the lossy coding mode in a transform skip mode. The techniques of this disclosure include restricting the size of residual blocks for which repositioning can be performed in both the lossy coding mode and the lossless coding mode.

In this case, in order to determine whether to reposition the residual block, reposition unit 66 determines a prediction mode of the residual block for which a transform is not applied (220). If the residual block is in the inter-prediction mode (YES branch of 222), reposition unit 66 disables the repositioning process and does not rotate or flip the residual data of the residual block (232). If the residual block is not in the inter-prediction mode (NO branch of 222) but the residual block is in the intra BC prediction mode (YES branch of 224), reposition unit 66 disables the repositioning process and does not rotate or flip the residual data of the residual block (232).

If the residual block is not in the intra BC prediction mode (NO branch of 224) but the residual block is in the intra-prediction mode (YES branch of 226), reposition unit 66 determines a size of the residual block in the lossless coding mode (228). If the size of the residual block is less than or equal to a threshold block size (YES branch of 230), then reposition unit 66 determines whether to reposition, i.e., rotate or flip, the residual block (234). If the size of the residual block is greater than the threshold size (NO branch of 230), reposition unit 66 disables the repositioning process and does not rotate or flip the residual data of the residual block (232). If the residual block is not in the intra-prediction mode (NO branch of 226), reposition unit 66 disables the repositioning process and does not rotate or flip the residual data of the residual block (232). In other examples, if the residual block in any of the prediction modes uses RDPCM, reposition unit 66 may disable the repositioning process and not rotate or flip the residual data of the residual block.

In one example, the threshold size used in operation 230 for determining whether to perform repositioning of the residual blocks is 8×8. In another example, the threshold size is equal to 4×4. In a further example, the transform skip mode may be restricted to apply only to residual blocks in the lossy coding mode having sizes up to a maximum block size, e.g., 4×4 or 8×8. The maximum block size for which the transform is permitted to be skipped in the lossy coding mode may be indicated in one of a SPS and a PPS associated with the residual block. In this case, the threshold size for determining whether to perform repositioning of the residual blocks in both the lossy coding mode and the lossless coding mode is less than or equal to a maximum block size for which a transform can be skipped in the lossy coding mode, e.g., 4×4 or 8×8. Setting the threshold block size to be less than or equal to the maximum block size for which a transform can be skipped in the lossy coding mode aligns the block sizes for which rotation can be performed for both lossless and lossy coding mode cases.

In the case of a rotation process, the repositioning determination may be performed by one of the operations described in more detail above with respect to FIGS. 5-8. In some examples, when the residual block is an intra-prediction residual block, the rotation will always be applied when the block size of the residual block satisfies the threshold block size criterion. In some cases, the rotation of the residual block may be limited to 180 degrees. In other cases, when the residual block is an intra-prediction residual block that satisfies the threshold block size criterion, the rotation of the residual block may be determined to be one of 0 degrees, 90 degrees, 180 degrees or 270 degrees according to the techniques described above.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, from a bitstream, residual data of a residual block, the residual block being coded in a transform skip mode such that the residual block is not converted from a pixel domain to a frequency domain;
    determining, based on a prediction mode of the residual block and a size of the residual block, whether to reposition residual data of the residual block prior to reconstructing a video block of the video data from the residual data of the residual block, wherein repositioning the residual data comprises one of rotating or flipping the residual data of the residual block, wherein, based on the prediction mode of the residual block being an intra prediction mode and the size of the residual block being less than or equal to a threshold size, a determination is made to reposition the residual data of the residual block, and wherein, based on the prediction mode of the residual block being the intra prediction mode and the size of the residual block being greater than the threshold size, a determination is made to disable repositioning of the residual data of the residual block; and
    reconstructing the video block of the video data from the residual data after determining whether to reposition the residual data.

2. The method of claim 1, wherein the threshold size is equal to one of an 8×8 block or a 4×4 block.

3. The method of claim 1, wherein the threshold size is less than or equal to a maximum block size for which a transform is permitted to be skipped in the lossy coding mode, and wherein the maximum block size for which the transform is permitted to be skipped in the lossy coding mode is indicated in one of a sequence parameter set (SPS) and a picture parameter set (PPS) associated with the video data.

4. The method of claim 1, wherein based on the prediction mode of the residual block being an inter-prediction mode, the determination is made to disable repositioning of the residual data of the residual block.

5. The method of claim 1, wherein, based on the prediction mode of the residual block being an intra block copying prediction mode, the determination is made to reposition the residual data of the residual block.

6. The method of claim 1, wherein based on the prediction mode of the residual block being one of an inter-prediction mode using residual differential pulse code modulation (DPCM) or an intra block copying prediction mode using residual DPCM, the determination is made to disable repositioning of the residual data of the residual block.

7. The method of claim 1, further comprising, based on a determination to reposition the residual data of the residual block, repositioning the residual data of the residual block to reverse one of a rotation or a flip performed during encoding the residual data of the residual block that positioned a portion of the residual data with higher energy than average at a top left corner of the residual block.

8. The method of claim 1, wherein determining whether to reposition the residual data of the residual block comprises determining to rotate the residual block, the method further comprising rotating the residual block by a predetermined rotation value.

9. The method of claim 1, wherein determining whether to reposition the residual data of the residual block comprises determining a rotation value for the residual block, the method further comprising rotating the residual block by the determined rotation value.

10. The method of claim 1, wherein determining whether to reposition the residual data of the residual block comprises determining to flip the residual data of the residual block, the method further comprising flipping the residual data of the residual block along one of a main diagonal or an anti-diagonal of the residual block.

11. A method of encoding video data, the method comprising:
    encoding residual data of a residual block, the residual block being coded in a transform skip mode such that the residual block is not converted from a pixel domain to a frequency domain; and
    determining, based on a prediction mode of the residual block and a size of the residual block, whether to reposition residual data of the residual block prior to encoding a video block of the video data from the residual data of the residual block, wherein repositioning the residual data comprises one of rotating or flipping the residual data of the residual block,
    wherein, based on the prediction mode of the residual block being an intra prediction mode and the size of the residual block being less than or equal to a threshold size, a determination is made to reposition the residual data of the residual block, and wherein, based on the prediction mode of the residual block being the intra prediction mode and the size of the residual block being greater than the threshold size, a determination is made to disable repositioning of the residual data of the residual block; and
    encoding the video block based on the residual data of the residual block after determining whether to reposition the residual data.

12. The method of claim 11, wherein the threshold size is equal to one of an 8×8 block or a 4×4 block.

13. The method of claim 11, wherein the threshold size is less than or equal to a block size for which a transform is permitted to be skipped in the lossy coding mode, the method further comprising indicating the maximum block size for which the transform is permitted to be skipped in the lossy coding mode in one of a sequence parameter set (SPS) and a picture parameter set (PPS) associated with the video data.

14. The method of claim 11, wherein based on the prediction mode of the residual block being an inter-prediction mode, the determination is made to disable repositioning of the residual data of the residual block.

15. The method of claim 11, wherein based on the prediction mode of the residual block being an intra block copying prediction mode, the determination is made to reposition the residual data of the residual block.

16. The method of claim 11, wherein based on the prediction mode of the residual block being one of an inter-prediction mode using residual differential pulse code modulation (DPCM) or an intra block copying prediction mode using residual DPCM, the determination is made to disable repositioning of the residual data of the residual block.

17. The method of claim 11, further comprising, based on a determination to reposition the residual data of the residual block, one of rotating or flipping the residual data of the residual block in order to position a portion of the residual data with higher energy than average at a top left corner of the residual block.

18. The method of claim 11, wherein determining whether to reposition the residual data of the residual block comprises determining to rotate the residual block, the method further comprising rotating the residual block by a predetermined rotation value.

19. The method of claim 11, wherein determining whether to reposition the residual data of the residual block comprises determining a rotation value for the residual block, the method further comprising rotating the residual block by the determined rotation value.

20. The method of claim 11, wherein determining whether to reposition the residual data of the residual block comprises determining to flip the residual data of the residual block, the method further comprising flipping the residual data of the residual block along one of a main diagonal or an anti-diagonal of the residual block.

21. A video coding device for coding video data, the device comprising:
a memory configured to store video data; and
one or more processors configured to:
code residual data of a residual block, the residual block being coded in a transform skip mode such that the residual block is not converted from a pixel domain to a frequency domain;
determine, based on a prediction mode of the residual block and a size of the residual block, whether to reposition residual data of the residual block prior to coding a video block of the video data from the residual data of the residual block, wherein repositioning the residual data comprises one of rotating or flipping the residual data of the residual block, wherein, based on the prediction mode of the residual block being an intra prediction mode and the size of the residual block being less than or equal to a threshold size, a determination is made to reposition the residual data of the residual block, and wherein, based on the prediction mode of the residual block being the intra prediction mode and the size of the residual block being greater than the threshold size, a determination is made to disable repositioning of the residual data of the residual block; and
code the video block based on the residual data of the residual block after determining whether to reposition the residual data.

22. The device of claim 21, wherein the threshold size is less than or equal to a block size for which a transform is permitted to be skipped in a lossy coding mode, and wherein the maximum block size for which the transform is permitted to be skipped in the lossy coding mode is indicated in one of a sequence parameter set (SPS) and a picture parameter set (PPS) associated with the video data.

23. The device of claim 21, wherein, based on the prediction mode of the residual block being an inter-prediction mode, the determination is made to disable repositioning of the residual data of the residual block.

24. The device of claim 21, wherein, based on the prediction mode of the residual block being an intra block copying prediction mode, the determination is made to reposition the residual data of the residual block.

25. The device of claim 21, wherein the video coding device comprises a video encoding device for encoding video data, and wherein, based on a determination to reposition the residual data of the residual block, the processors are configured to one of rotate or flip the residual data of the residual block in order to position a portion of the residual data with higher energy than average at a top left corner of the residual block.

26. The device of claim 21, wherein the video coding device comprises a video decoding device for decoding video data, and wherein, based on a determination to reposition the residual data of the residual block, the processors are configured to reposition the residual data of the residual block to reverse one of a rotation or a flip performed during encoding the residual data of the residual block that positioned a portion of the residual data with higher energy than average at a top left corner of the residual block.

27. A non-transitory computer readable medium comprising instructions for coding video data, the instructions, when executed, cause one or more programmable processors to:
code residual data of a residual block, the residual block being coded in a transform skip mode such that the residual block is not converted from a pixel domain to a frequency domain;
determine, based on a prediction mode of the residual block and a size of the residual block, whether to reposition residual data of the residual block prior to coding a video block of the video data from the residual data of the residual block, wherein repositioning the residual data comprises one of rotating or flipping the residual data of the residual block, wherein, based on the prediction mode of the residual block being an intra prediction mode and the size of the residual block being less than or equal to a threshold size, a determination is made to reposition the residual data of the residual block, and wherein, based on the prediction mode of the residual block being the intra prediction mode and the size of the residual block being greater than the threshold size, a determination is made to disable repositioning of the residual data of the residual block; and
code the video block based on the residual data of the residual block after determining whether to reposition the residual data.

* * * * *